US011965499B2

(12) United States Patent
Tanaka et al.

(10) Patent No.: US 11,965,499 B2
(45) Date of Patent: Apr. 23, 2024

(54) MOTOR AND AIR COMPRESSOR

(71) Applicant: MAX CO., LTD., Tokyo (JP)

(72) Inventors: Hiroyuki Tanaka, Kiryu (JP); Takashi Ando, Kiryu (JP); Tomohide Tsutsui, Tokyo (JP); Hisami Oguri, Tokyo (JP)

(73) Assignee: Max Co., Ltd., Tokyo (JP)

(*) Notice: Subject to any disclaimer, the term of this patent is extended or adjusted under 35 U.S.C. 154(b) by 0 days.

(21) Appl. No.: 17/586,262

(22) Filed: Jan. 27, 2022

(65) Prior Publication Data

US 2022/0239200 A1 Jul. 28, 2022

(30) Foreign Application Priority Data

Jan. 28, 2021 (JP) .................................. 2021-012029
Jan. 25, 2022 (JP) .................................. 2022-009748

(51) Int. Cl.
*F04B 35/04* (2006.01)
*F04B 53/16* (2006.01)
(Continued)

(52) U.S. Cl.
CPC .............. *F04B 35/04* (2013.01); *F04B 53/16* (2013.01); *H02K 5/04* (2013.01); *H02K 7/003* (2013.01); *H02K 7/14* (2013.01); *H02K 11/215* (2016.01)

(58) Field of Classification Search
CPC ........ F04B 9/045; F04B 25/005; F04B 35/04; H02K 5/04; H02K 5/22; H02K 7/003;
(Continued)

(56) References Cited

U.S. PATENT DOCUMENTS 6,278,248 B1 * 8/2001 Hong ..................... H02P 6/14
318/400.26
7,876,008 B2 * 1/2011 Yoshida ................ H02K 3/522
310/216.115
(Continued)

FOREIGN PATENT DOCUMENTS

JP 5264864 B2 8/2013
JP 2016-144265 A 8/2016
(Continued)

OTHER PUBLICATIONS

Extended European Search Report dated Jun. 9, 2022, issued by the European Patent Office in the corresponding European Patent Application No. 22153772.3. (6 pages).

*Primary Examiner* — Devon C Kramer
*Assistant Examiner* — Joseph S. Herrmann
(74) *Attorney, Agent, or Firm* — Banner & Witcoff, Ltd.

(57) ABSTRACT

A motor includes: a central shaft; a stator extending in an axial direction around the central shaft; a rotor facing an outer side in a radial direction of the stator and configured to rotate around the central shaft; a substrate located on one side in the axial direction with respect to the rotor and on which a rotation position detection circuit detecting a rotation position of the rotor is mounted; and a case located on one side in the axial direction with respect to the substrate and supporting the stator. The stator includes a restricting portion restricting a position in a circumferential direction of the substrate. The case includes a fixing portion fixing the substrate. The substrate includes a restricted portion whose position in the circumferential direction is restricted by the restricting portion, and a fixed portion fixed to the fixing portion.

14 Claims, 22 Drawing Sheets

(51) Int. Cl.
*H02K 5/04* (2006.01)
*H02K 7/00* (2006.01)
*H02K 7/14* (2006.01)
*H02K 11/215* (2016.01)

(58) Field of Classification Search
CPC ............ H02K 7/06; H02K 7/075; H02K 7/14; H02K 11/215
USPC .......................................................... 310/63
See application file for complete search history.

(56) References Cited

U.S. PATENT DOCUMENTS

| | | | | |
|---|---|---|---|---|
| 9,531,243 | B2* | 12/2016 | Sakai | H02K 11/33 |
| 2005/0175469 | A1* | 8/2005 | Lucchi | F04B 39/066 |
| | | | | 417/234 |
| 2008/0112823 | A1* | 5/2008 | Yoshida | F04B 35/04 |
| | | | | 417/410.1 |

FOREIGN PATENT DOCUMENTS

| | | |
|---|---|---|
| WO | 2010/041774 A1 | 4/2010 |
| WO | 2016/208031 A1 | 12/2016 |

* cited by examiner

MOTOR AND AIR COMPRESSOR

CROSS-REFERENCE TO RELATED APPLICATIONS

This application is based upon and claims the benefit of priority from prior Japanese patent application No. 2021-012029, filed on Jan. 28, 2021 and Japanese patent application No. 2022-009748, filed on Jan. 25, 2022, the entire contents of which are incorporated herein by reference.

TECHNICAL FIELD

The present invention relates to a motor and an air compressor using the motor.

BACKGROUND ART

A motor controls rotation by including a rotation position detection circuit that detects the rotation position of a rotor. It is important that a substrate on which a rotation position detection circuit is mounted has a constant positional relationship with a stator. It is available that a motor in which a substrate on which a rotation position detection circuit is mounted is fixed to a stator (see PTL 1).
PTL 1: Japanese Patent No. 5264864

When a motor is used in an environment where there is charged dust, etc., a substrate on which a rotation position detection circuit is mounted may be replaced in order to suppress the influence of the environment. When the substrate is fixed to the stator as disclosed in PTL 1, it is necessary to disassemble the motor so that the attachment position of the substrate is exposed when replacing the substrate, which causes a problem that the replacement work is complicated.

An object of the invention is to provide a motor in which a substrate can be easily replaced.

Another object of the invention is to provide a structure of an air compressor using a motor, in which a substrate can be easily replaced.

SUMMARY OF INVENTION

According to an aspect of the invention, there is provided a motor including: a central shaft extending in an axial direction; a stator extending in the axial direction around the central shaft; a rotor facing an outer side in a radial direction of the stator and configured to rotate around the central shaft; a substrate which is located on one side in the axial direction with respect to the rotor and on which a rotation position detection circuit configured to detect a rotation position of the rotor is mounted; and a case located on one side in the axial direction with respect to the substrate and configured to support the stator, in which the stator includes a restricting portion configured to restrict a position in a circumferential direction of the substrate, the case includes a fixing portion configured to fix the substrate, and the substrate includes a restricted portion whose position in the circumferential direction is restricted by the restricting portion, and a fixed portion fixed to the fixing portion.

According to another aspect of the invention, there is provided an air compressor including: a motor; a compression mechanism configured to be driven by the motor; and a crankcase in which a part of the compression mechanism is incorporated, in which the motor includes: a central shaft extending in an axial direction; a stator extending in the axial direction around the central shaft; a rotor facing an outer side in a radial direction of the stator and configured to rotate around the central shaft; and a substrate which is located on one side in the axial direction with respect to the rotor and on which a rotation position detection circuit configured to detect a rotation position of the rotor is mounted, the crankcase includes a fixing portion configured to fix the substrate, and the substrate includes a fixed portion fixed to the fixing portion.

According to an aspect of the invention, it is possible to provide the motor in which the substrate can be easily replaced.

According to another aspect of the invention, it is possible to provide the structure of the air compressor using the motor, in which the substrate can be easily replaced.

DESCRIPTION OF EMBODIMENTS

Figure 1:
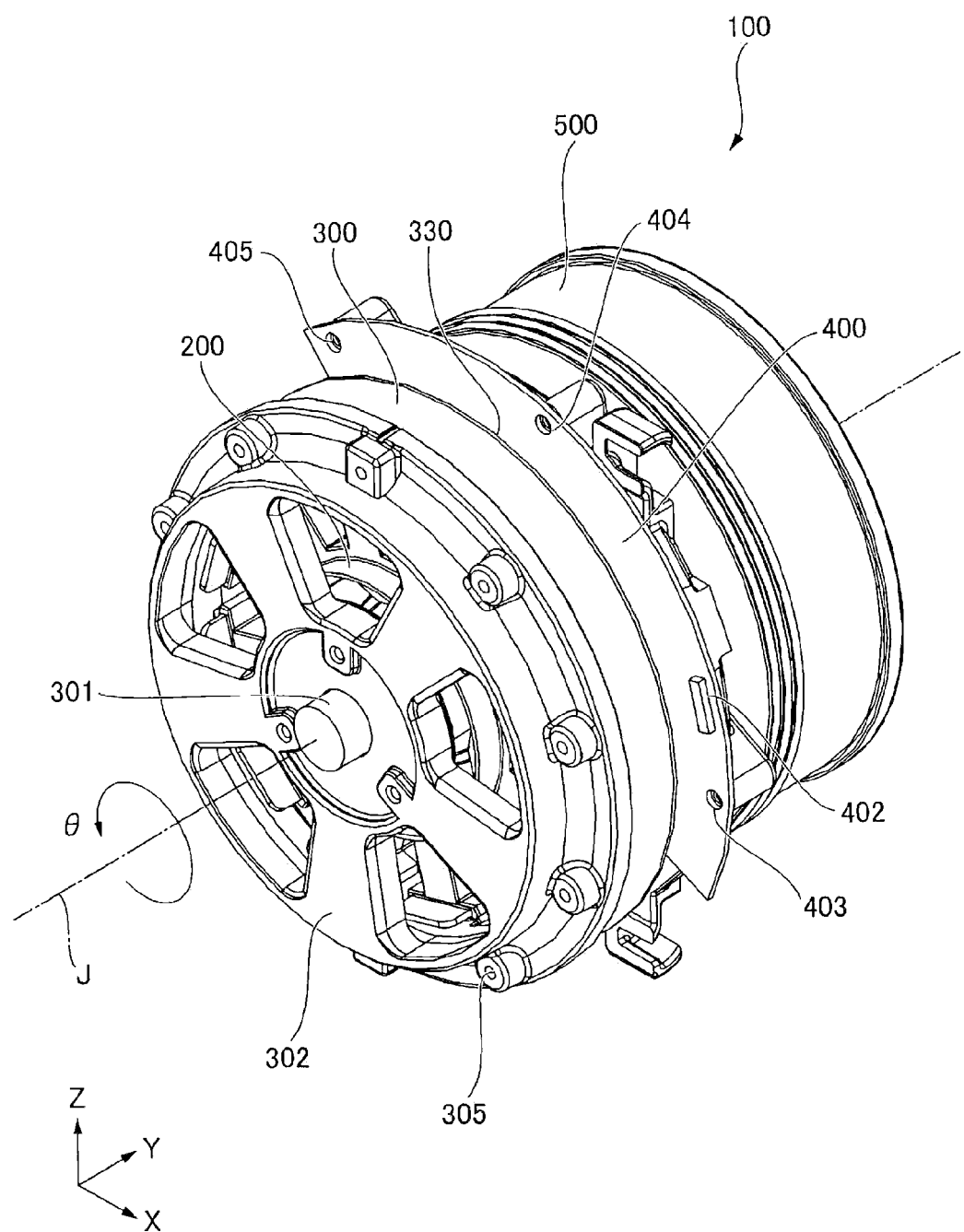
FIG. 1 is a perspective view showing a motor according to a first embodiment of the invention, in which a winding is not shown.

Hereinafter, a motor and an air compressor according to an embodiment of the invention will be described with reference to the drawings. Meanwhile, in the following drawings, in order to make each configuration easy to understand, the scale and number and the like in each structure may be different from those in the actual structure.

Further, in the drawings, the XYZ coordinate system is shown as a three-dimensional Cartesian coordinate system as appropriate. In the XYZ coordinate system, the Y-axis direction is defined as a direction parallel to an axial direction of a central axis J shown in FIG. 1. The Z-axis direction is defined as an upper and lower direction of FIG. 1 in a radial direction with respect to the central axis J. The X-axis direction is defined as a direction orthogonal to both the Z-axis direction and the Y-axis direction. In any of the X-axis direction, the Y-axis direction, and the Z-axis direction, the side pointed by the arrow shown in the drawing is defined as the + side, and the opposite side is defined as the − side.

Further, in the following description, the positive side (+Y side) in the Y-axis direction is referred to as the "front side" or "one side," and the negative side (−Y side) in the Y-axis direction is referred to as the "rear side" or "the other side." Meanwhile, the rear side (the other side) and the front side (one side) are names used only for explanation and do not limit the actual positional relationship and direction. Further, unless otherwise noted, the direction (Y-axis direction) parallel to the central axis J is simply referred to as the "axial direction," the radial direction centered on the central axis J is simply referred to as the "radial direction," and the circumferential direction centered on the central axis J, that is, the circumference (θ-direction) of the central axis J is simply referred to as the "circumferential direction." In the radial direction, the side approaching the central axis J is referred to as the "inner side in the radial direction," and the side away from the central axis J is referred to as the "outer side in the radial direction." In the circumferential direction, the side pointed by the arrow shown in the drawing is defined as the + side, and the opposite side is defined as the − side. The positive side (+θ side) in the circumferential direction is referred to as "one side," and the negative side (−θ side) in the circumferential direction is referred to as "the other side."

Meanwhile, as used herein, the phrase "extending in the axial direction" includes not only the case of extending strictly in the axial direction (Z-axis direction), but also the case of extending in a direction inclined in a range of less than 45° with respect to the axial direction. Further, as used herein, the phrase "extending in the radial direction" includes not only the case of extending strictly in the radial direction, that is, in a direction perpendicular to the axial direction (Z-axis direction), but also the case of extending in a direction inclined in a range of less than 45° with respect to the radial direction. Further, the phrase "being parallel" includes not only the case of being strictly parallel, but also the case where the angle formed by each other is inclined in a range of less than 45°.

First Embodiment

<Overall Configuration>

FIG. 1 is a perspective view showing a motor 100 according to a first embodiment of the invention, in which a winding is not shown.

Figure 2:
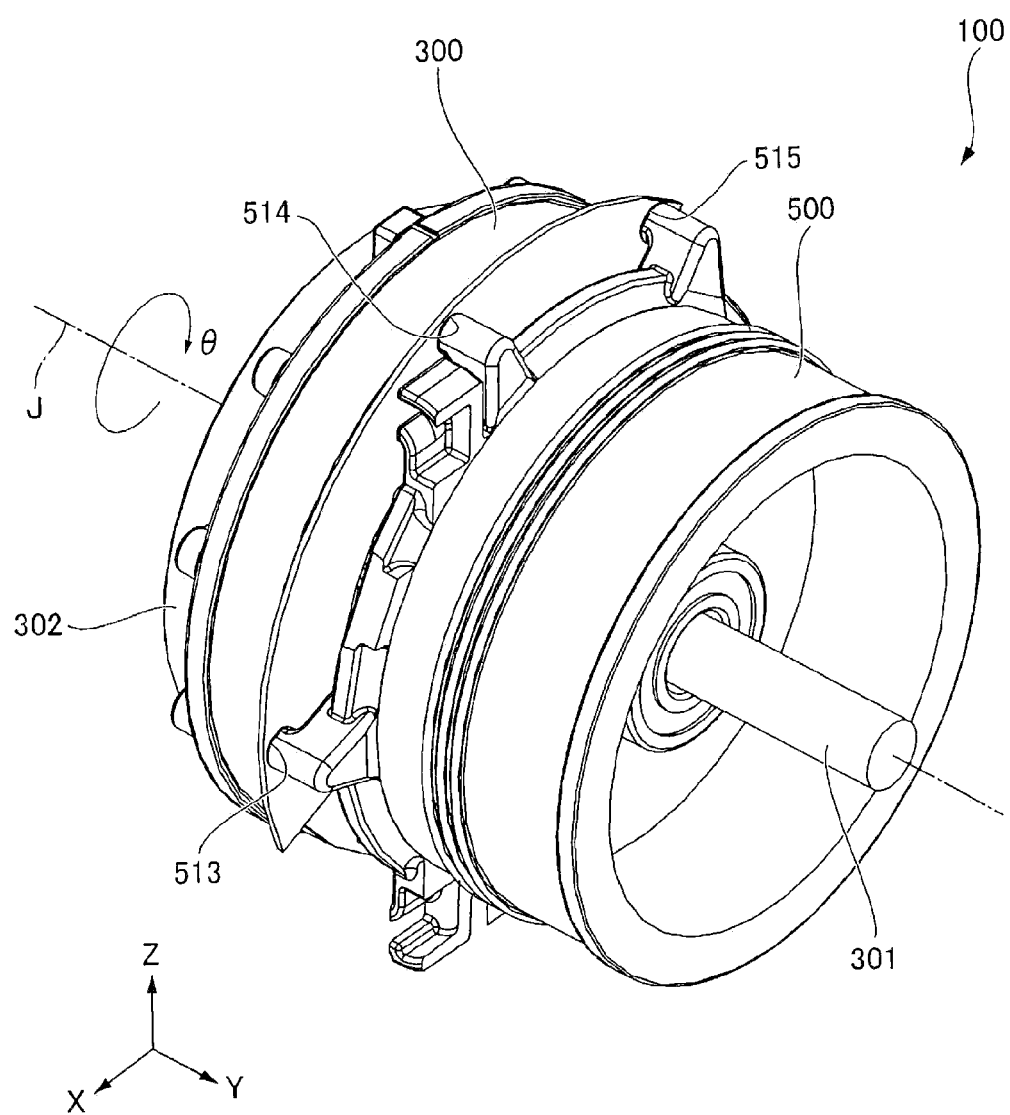
FIG. 2 is a rear perspective view of the motor shown in FIG. 1, as viewed from the +Y side.

FIG. 2 is a rear perspective view of the motor 100 shown in FIG. 1, as viewed from the +Y side.

The motor 100 includes a shaft 301 extending in the axial direction, a stator 200, a rotor 300, a substrate 400, and a case 500. The motor 100 is an outer rotor type motor in which the rotor 300 is arranged on the outer side in the radial direction of the stator 200.

The rotor 300 includes a magnet holder 330 on one side in the axial direction. The rotor 300 includes a rotor plate 302 on the other side in the axial direction. The rotor plate 302 is made of a non-magnetic material, and is, for example, an aluminum die-cast part. The rotor plate 302 has a through-hole 305 that penetrates in the axial direction. Ten through-holes 305 are provided at equal intervals in the circumferential direction.

Hall ICs 411, 412, and 413 (see FIG. 9) and a connector 402 are mounted on the substrate 400. The Hall ICs 411, 412, and 413 are examples of rotation position detection circuits that detect the rotation position of the rotor 300. The connector 402 has a terminal capable of externally outputting the signal detected by the Hall ICs 411, 412, and 413. The substrate 400 has through-holes 403, 404, and 405 that penetrate in the axial direction.

The case 500 is located on one side in the axial direction with respect to the substrate 400. The case 500 supports the stator 200. The case 500 may not directly support the stator 200. The substrate 400 is fixed to the case 500 by being screwed into screw holes 513, 514, and 515 of the case 500 through the through-hole 403, 404, and 405. The screw holes 513, 514, and 515 of the case 500 extend from one end in the axial direction to the other side in the axial direction. The screw holes 513, 514, and 515 of the case 500 are examples of fixing portions. The through-holes 403, 404, and 405 of the substrate 400 are examples of fixed portions. Three or more fixing portions and fixed portions are provided. Since the substrate 400 is fixed to the case 500 instead of being fixed to the stator 200, the substrate 400 can be easily retrofitted and replaced.

The through-holes 403, 404, and 405 of the substrate 400 are located on the outer side in the radial direction with respect to the rotor 300. That is, the fixing portions and the fixed portions are located on the outer side in the radial direction with respect to the rotor 300. In this way, the substrate 400 can be easily fixed and removed.

Figure 3:
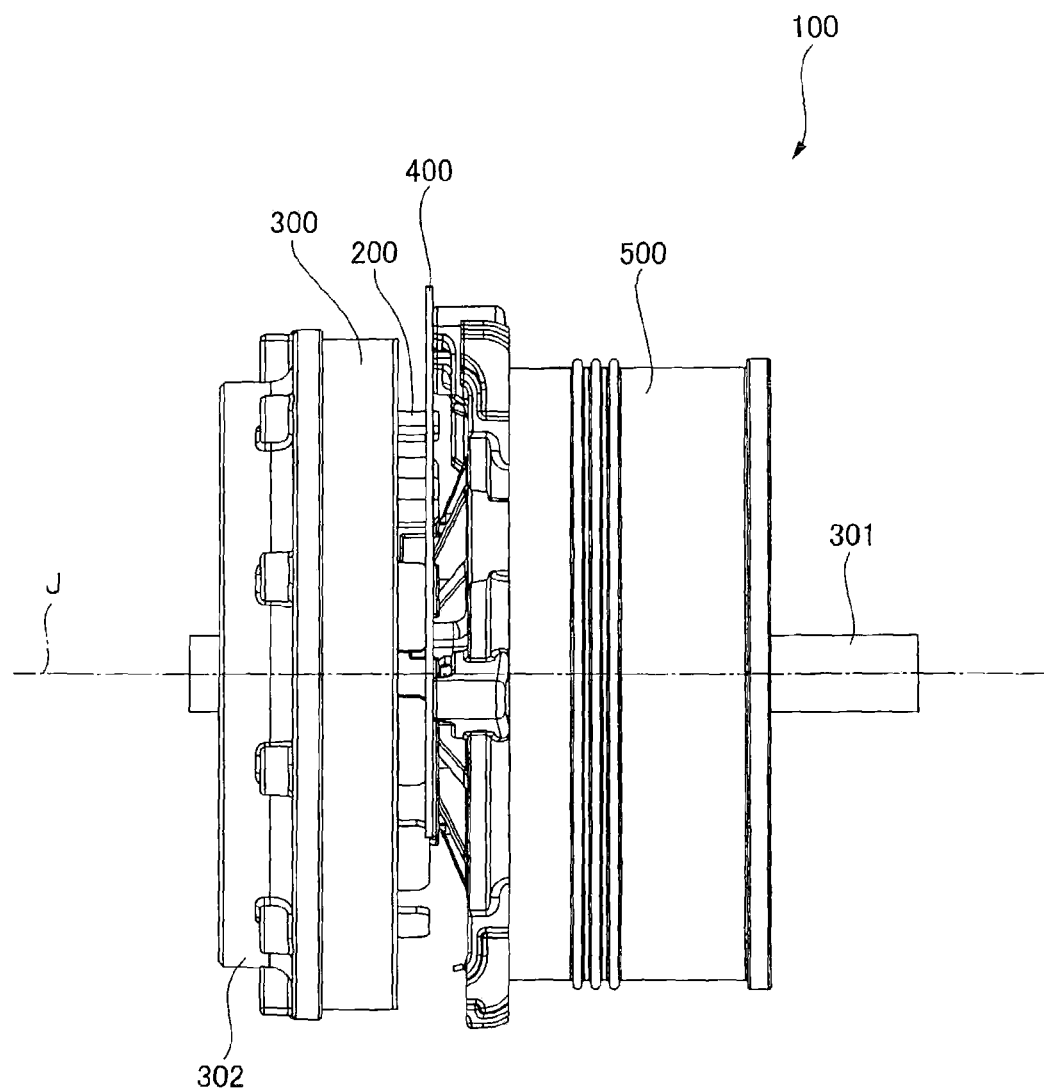
FIG. 3 is a side view of the motor shown in FIG. 1, as viewed from the +X side.

FIG. 3 is a side view of the motor 100 shown in FIG. 1, as viewed from the +X side.

Figure 4:
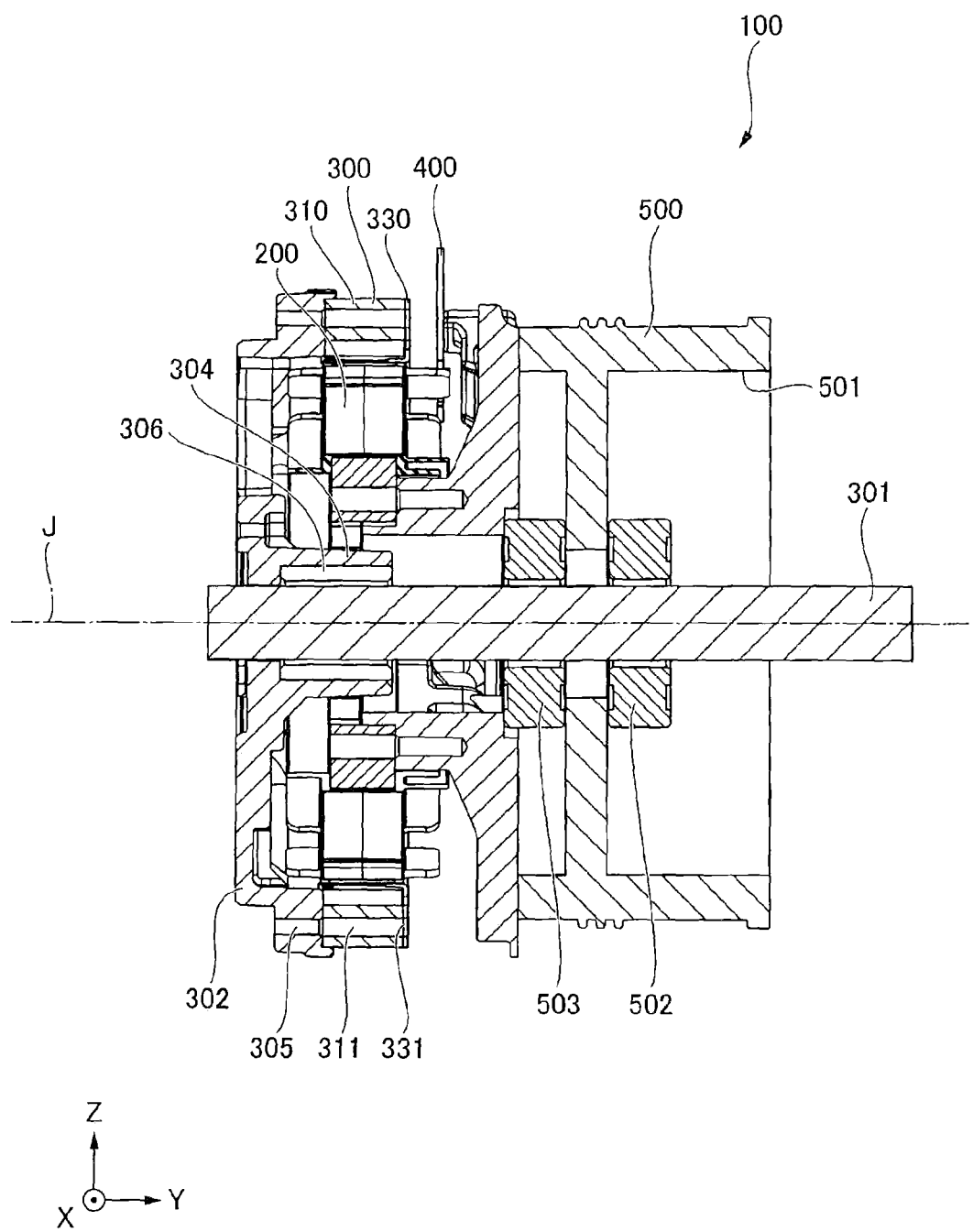
FIG. 4 is a side sectional view showing the motor shown in FIG. 3, taken along a plane orthogonal to the X-axis and passing through a central axis J.

FIG. 4 is a side sectional view showing the motor 100 shown in FIG. 3, taken along a plane orthogonal to the X-axis and passing through the central axis J.

In FIGS. 3 and 4, the parts mounted on the substrate 400 are not shown.

The shaft 301 extends along the central axis J. The stator 200 extends in the axial direction about the central axis J. The rotor 300 faces the stator 200 on the outer side in the radial direction and rotates about the shaft 301. The rotor 300 includes the magnet holder 330, a rotor core 310, and the rotor plate 302 in this order from one side in the axial direction to the other side in the axial direction. The magnet holder 330 has a through-hole 331 that penetrates in the axial direction. Ten through-holes 331 are provided at equal intervals in the circumferential direction. The rotor core 310 has a through-hole 311 that penetrates in the axial direction. Ten through-holes 311 are provided at equal intervals in the circumferential direction. The rotor plate 302, the rotor core 310, and the magnet holder 330 are fixed by bolts or the like that penetrate the through-holes 305, 311, and 331. That is, the rotor core 310 is fitted with the rotor plate 302.

The rotor plate 302 includes a cylindrical portion 304 having a cylindrical hole that penetrates in the axial direction. The center of the cylindrical portion 304 is arranged along the central axis J. The shaft 301 penetrates the cylindrical hole of the cylindrical portion 304. The motor 100 includes a rotor bush 306 between an outer peripheral surface of the shaft 301 and an inner peripheral surface of the cylindrical portion 304. The shaft 301 is fixed to the rotor plate 302 via the rotor bush 306. That is, the rotor plate 302 is fitted with the shaft 301.

The case 500 has a through-hole 501 that penetrates in the axial direction. The case 500 has bearings 502 and 503 in the through-hole 501. The bearing 502 is arranged on one side in the axial direction with respect to the bearing 503. Outer peripheral surfaces of inner races of the bearings 502 and 503 are fixed to the case 500 in the through-hole 501. The shaft 301 is fixed to inner peripheral surfaces of inner races of the bearings 502 and 503. The shaft 301 is supported to be rotatable about the central axis J by the bearings 502 and 503.

Figure 5:
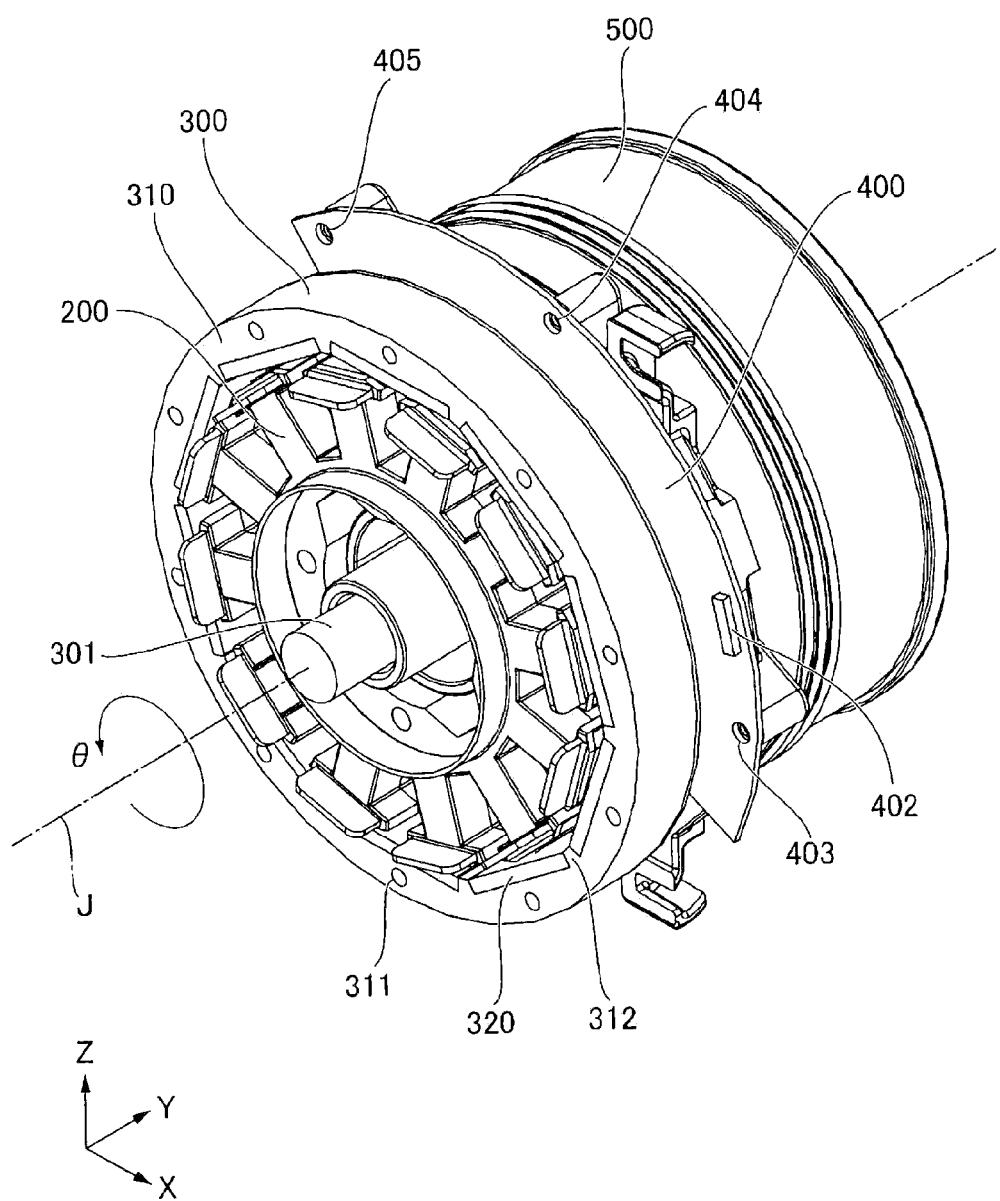
FIG. 5 is a perspective view showing a state in which a rotor plate is removed from FIG. 1.

FIG. 5 is a perspective view showing a state in which the rotor plate 302 is removed from FIG. 1.

The rotor core 310 is an annular member extending in the axial direction. The rotor core 310 is composed of, for example, a laminated steel plate formed by laminating electromagnetic steel plates in the axial direction. The rotor core 310 has, on the inner peripheral surface thereof, a side wall portion 312 protruding inward in the radial direction and extending in the axial direction. Ten side wall portions 312 are provided at equal intervals in the circumferential direction. The rotor 300 includes a rotor magnet 320. The rotor magnet 320 is a rectangular parallelepiped. The rotor magnet 320 is fixed between the side wall portion 312 and the side wall portion 312 adjacent to the side wall portion 312. Ten rotor magnets 320 are provided at equal intervals in the circumferential direction. The rotor magnets 320 face the stator 200 on the inner side in the radial direction.

Figure 6:
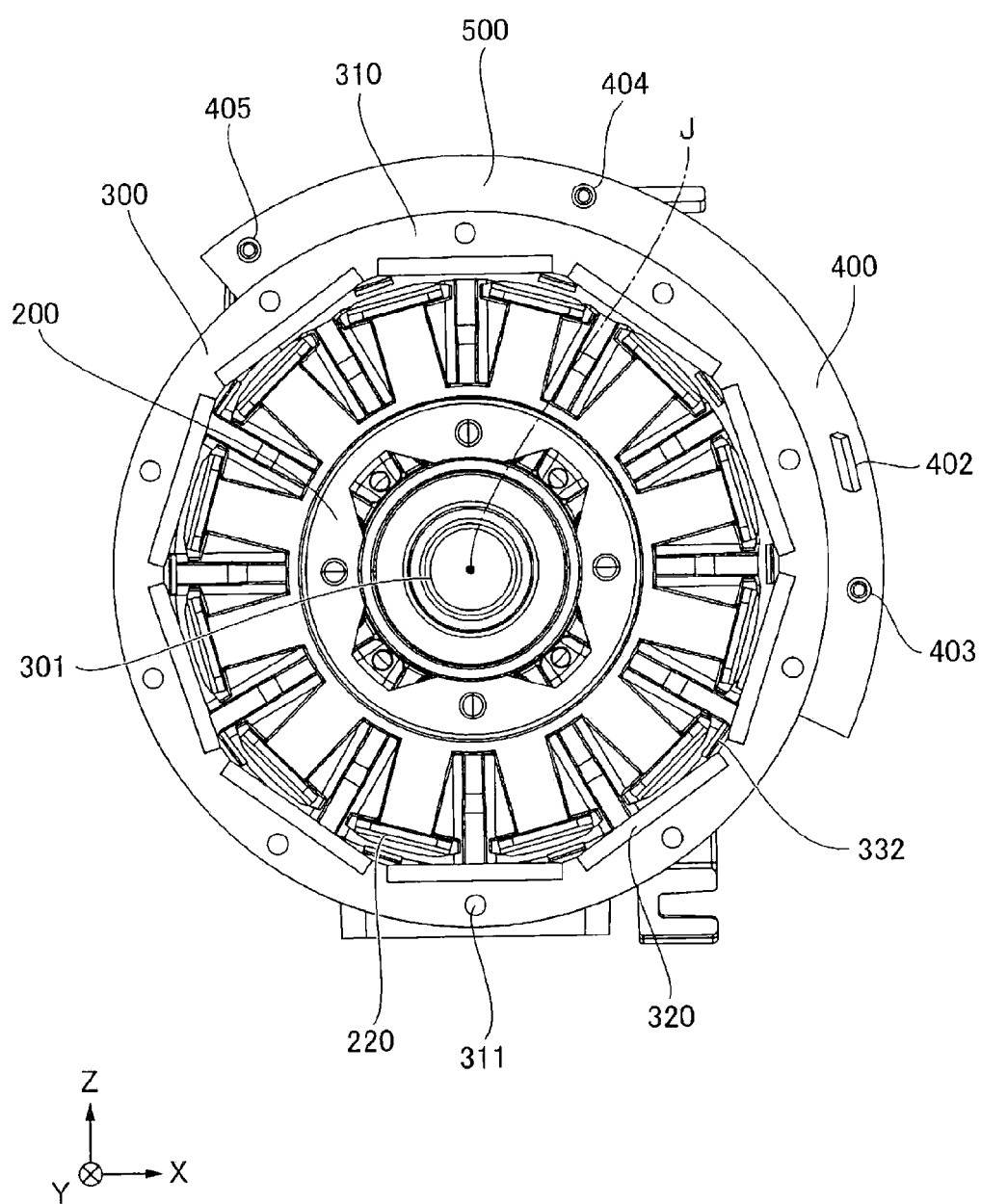
FIG. 6 is a front view showing a state in which the rotor plate is removed from the motor shown in FIG. 1, as viewed from the −Y side.

FIG. 6 is a front view showing a state in which the rotor plate 302 is removed from the motor 100 shown in FIG. 1, as viewed from the −Y side.

The inner surface in the radial direction of the rotor magnet 320 radially faces a claw portion 332 of the magnet holder 330. The one side surface in the axial direction of the rotor magnet 320 axially faces the claw portion 332 of the magnet holder 330. In this way, the claw portion 332 restricts the movement of the rotor magnet 320 toward one side in the axial direction and inward in the radial direction. The claw portion 332 is an example of a holder claw portion.

Figure 7:
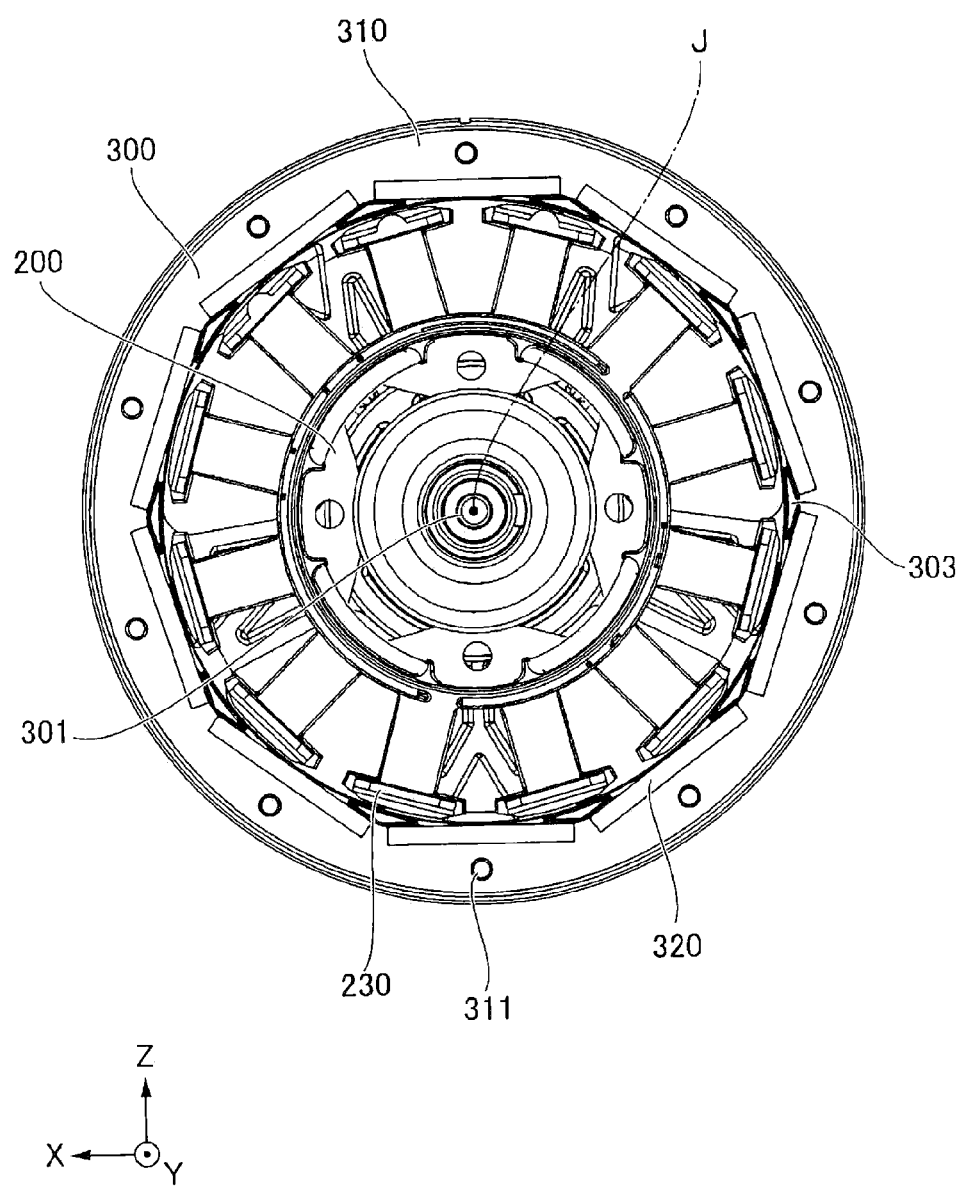
FIG. 7 is a rear view showing a state in which a case, a substrate, and a magnet holder are removed from the motor shown in FIG. 1, as viewed from the +Y side.

FIG. 7 is a rear view showing a state in which the case 500, the substrate 400, and the magnet holders 330 are removed from the motor 100 shown in FIG. 1, as viewed from the +Y side.

The inner surface in the radial direction of the rotor magnet 320 radially faces a claw portion 303 of the rotor plate 302. In this way, the claw portion 303 restricts the movement of the rotor magnet 320 inward in the radial direction. The claw portion 303 is an example of a plate claw portion. The other side surface in the axial direction of the rotor magnet 320 radially faces the rotor plate 302. In this way, the rotor plate 302 restricts the movement of the rotor magnet 320 toward the other side in the axial direction.

Figure 8:
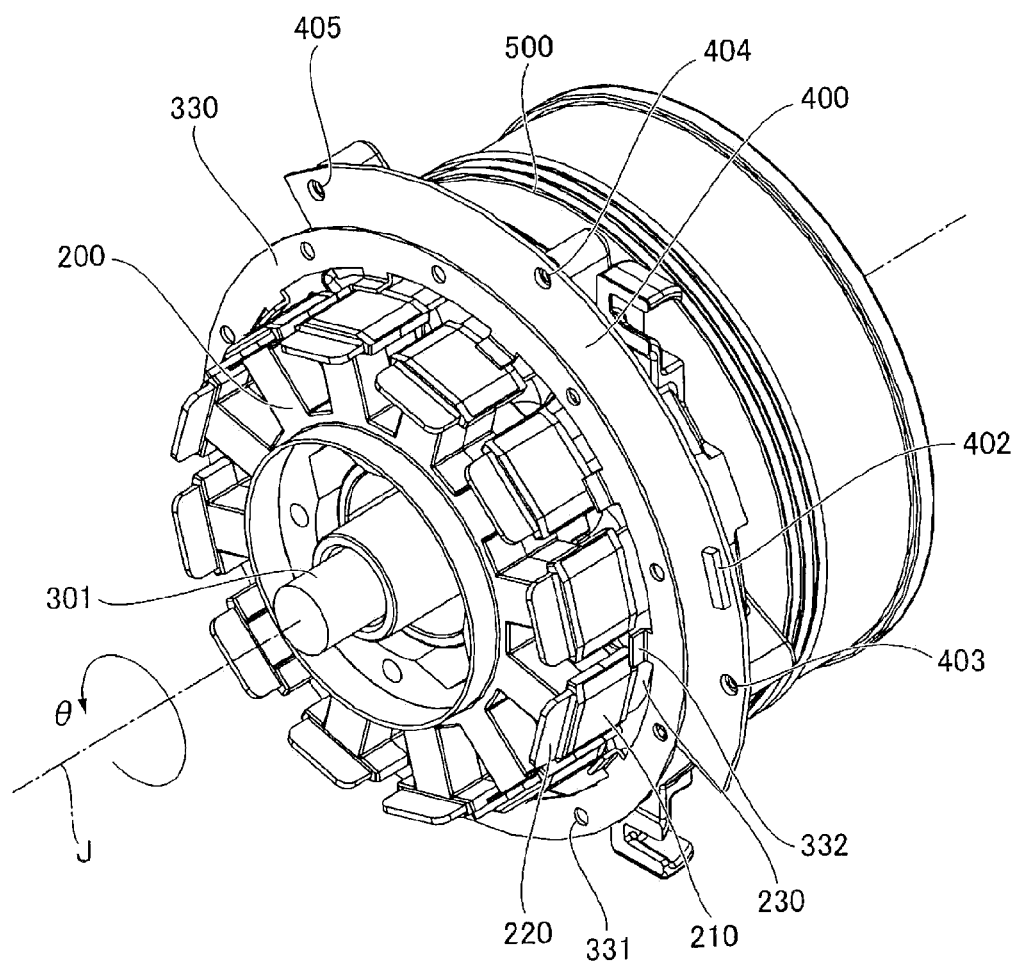
FIG. 8 is a perspective view showing a state in which a rotor core and a rotor magnet are removed from FIG. 5.

FIG. 8 is a perspective view showing a state in which the rotor core 310 and the rotor magnets 320 are removed from FIG. 5.

The stator 200 includes a stator core 210. The stator core 210 has twelve slots for accommodating the windings of the stator 200. The stator core 210 is composed of, for example, a laminated steel plate formed by laminating electromagnetic steel plates in the axial direction. The stator 200 includes an insulator 220 that covers the stator core 210 from the other side in the axial direction. The stator 200 includes an insulator 230 that covers the stator core 210 from one side in the axial direction. The insulators 220 and 230 are fixed to the stator core 210.

The magnet holder 330 is a member arranged on one side in the axial direction of the rotor core 310 and the rotor magnet 320. The magnet holder 330 is an annular member having a flat plate surface in the axial direction and making one revolution in the circumferential direction. The magnet holder 330 is made of, for example, a non-magnetic material such as aluminum. Since the magnet holder 330 is made of a non-magnetic material, it does not affect the magnetic field generated by the rotor magnet 320. The axial thickness of the magnet holder 330 is thicker than the axial thickness of one of the electromagnetic steel plates constituting the rotor core 310. In this way, the strength of the magnet holder 330 can be secured.

Figure 9:
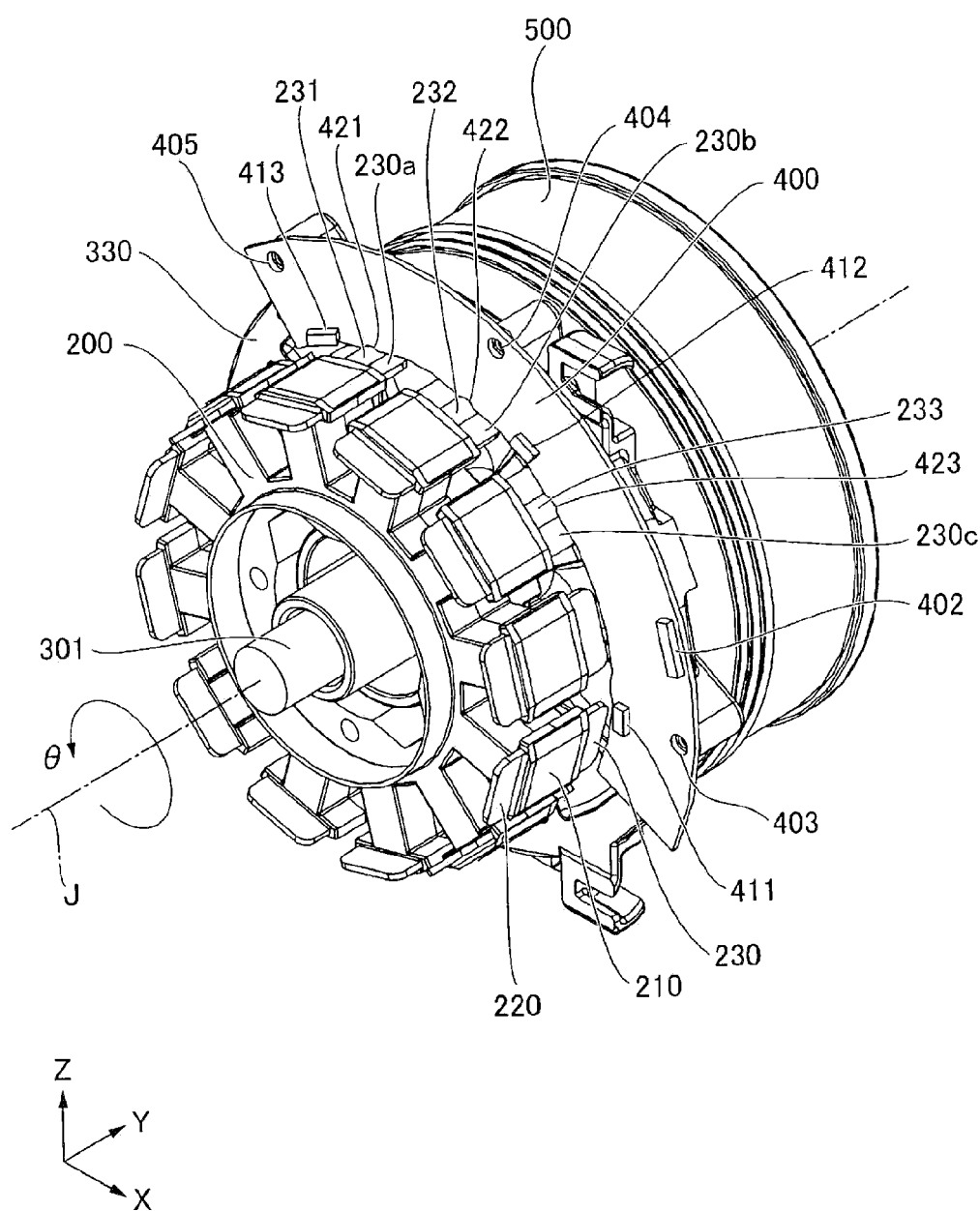
FIG. 9 is a perspective view showing a state in which the magnet holder is removed from FIG. 6.

FIG. 9 is a perspective view showing a state in which the magnet holder 330 is removed from FIG. 6.

The insulator 230 has, on the outer peripheral side thereof, thin-walled portions 230a, 230b, and 230c having a thin radial thickness. The thin-walled portion 230a has a convex portion 231 on the outer surface in the radial direction thereof. The thin-walled portion 230b has a convex portion 232 on the outer surface in the radial direction thereof. The thin-walled portion 230c has a convex portion 233 the outer surface in the radial direction thereof. The convex portions 231, 232, and 233 protrude outward in the radial direction and extend in the axial direction.

The substrate 400 has concave portions 421, 422, and 423 having shapes corresponding to the convex portions 231, 232, and 233 at positions corresponding to the convex portions 231, 232, and 233. The concave portions 421, 422, and 423 are recessed outward in the radial direction from the inner peripheral surface of the substrate 400.

The convex portions 231, 232, and 233 are fitted into the concave portions 421, 422, and 423 to restrict the position in the circumferential direction of the substrate 400. The shapes of the convex portions 231, 232, and 233, and the concave portions 421, 422, and 423 as viewed from the axial direction may be any shape such as a circle or a square as long as it can restrict the position in the circumferential direction of the substrate 400. The convex portions 231, 232, and 233 are examples of restricting portions. The concave portions 421, 422, and 423 are examples of restricted portions. A concave portion provided on the outer peripheral surface of the insulator 230 may be used as the restricting portion, and a convex portion provided on the substrate 400 may be used as the restricted portion. When the convex portions 231, 232, and 233 provided on the thin-walled portions 230a, 230b, and 230c are used as the restricting portions as in the present embodiment, the convex portions 231, 232, and 233 can serve as reinforcing ribs for the thin-walled portions 230a, 230b, and 230c, and can suppress the deformation in the radial direction of the insulator 230. The deformation in the radial direction of the insulator 230 causes the position of the substrate 400 to be shifted.

Figure 10:
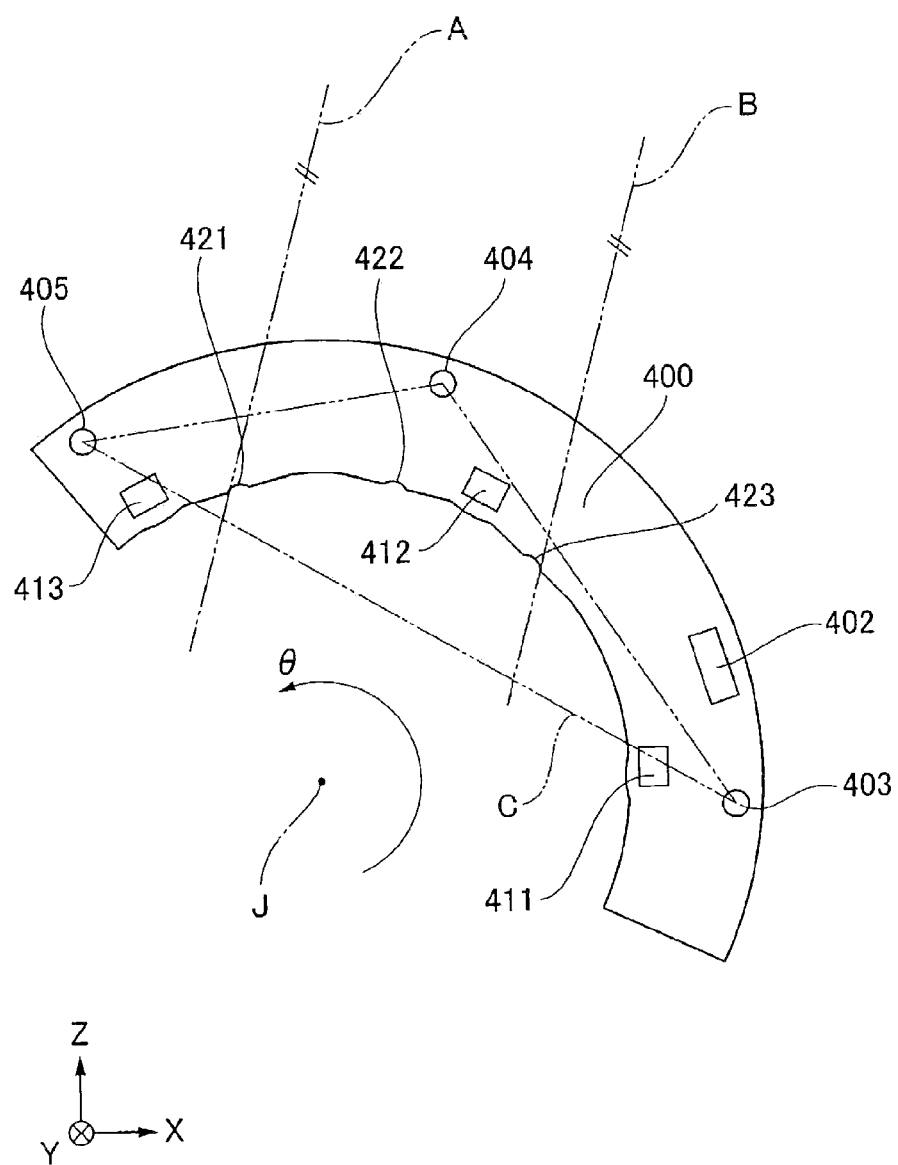
FIG. 10 is a front view of the substrate, as viewed from the −Y side.

FIG. 10 is a front view of the substrate 400, as viewed from the −Y side.

The Hall ICs 411, 412, and 413 are mounted at intervals of 60 degrees in the circumferential direction on the substrate 400. The substrate 400 has a length of 120 degrees in the circumferential direction.

The concave portions 421, 422, and 423 of the substrate 400 have a semicircular shape as viewed from the axial direction. Of the concave portions 421, 422, and 423, the concave portion 421 is the concave portion on the one end side in the circumferential direction. Of the concave portions 421, 422, and 423, the concave portion 423 is the concave portion on the other end side in the circumferential direction. A line A, which is a tangent line to one side surface in the circumferential direction of the concave portion 421, is parallel to a line B, which is a tangent line to the other side surface in the circumferential direction of the concave portion 423. In this way, when retrofitting the substrate 400, the convex portions 231, 232, and 233 can be smoothly fitted into the concave portions 421, 422, and 423, and the substrate 400 can be easily retrofitted. The convex portions 231, 232, and 233 may have a triangular shape as viewed from the axial direction. The convex portions 231, 232, and 233 may have a trapezoidal shape as viewed from the axial direction.

The concave portions 421, 422, and 423 are located in a triangle C that is a polygon having the through-holes 403, 404, and 405 of the substrate 400 as vertices. In this way, the positional deviation in the circumferential direction of the substrate 400 can be reduced. The triangle C is an example of a polygon having a fixing portion and a fixed portion as vertices.

In the present embodiment, a lead wire from the winding of the stator 200 is not connected to the substrate 400. Therefore, the substrate 400 does not have a power line for driving the motor 100. On the substrate 400, a Hall signal component connected to a motor drive control IC is arranged, and there is no motor drive control IC or the like. Therefore, the substrate 400 can be easily retrofitted and replaced.

Figure 11:
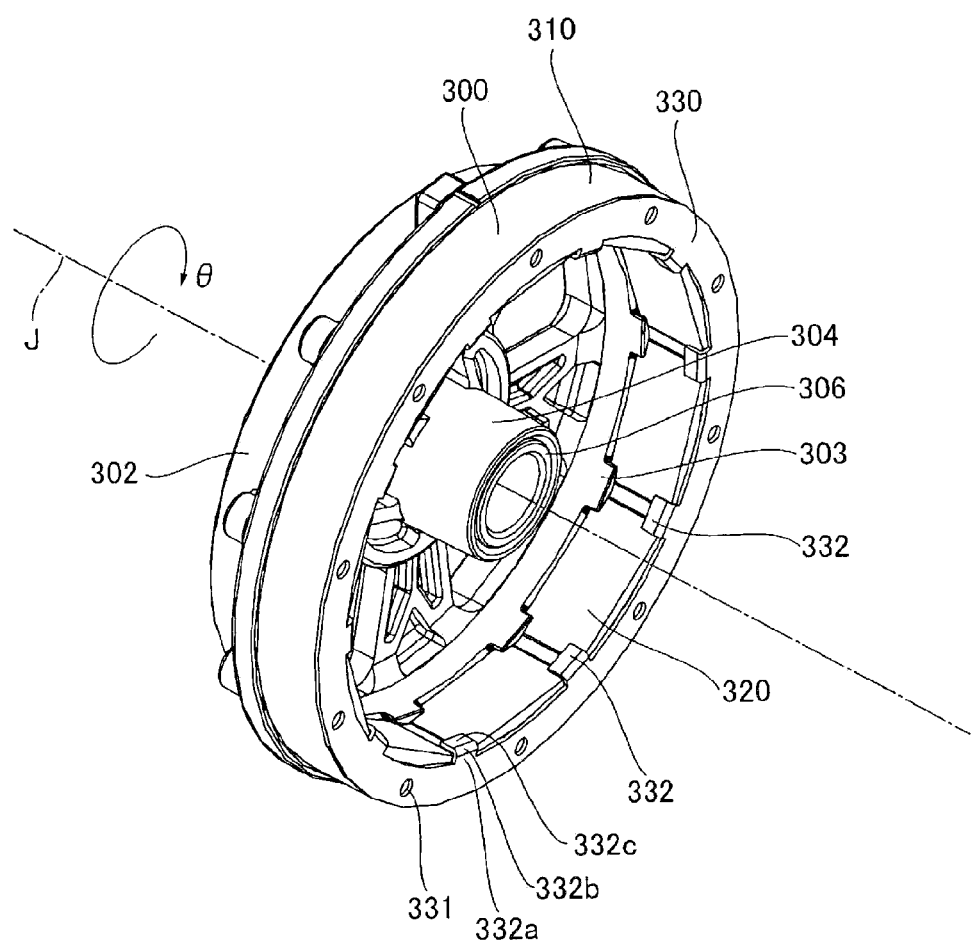
FIG. 11 is a rear perspective view showing a state in which a shaft, the case, and the substrate are removed from FIG. 2.

FIG. 11 is a rear perspective view showing a state in which the shaft 301, the case 500, and the substrate 400 are removed from FIG. 2.

Ten claw portions 332 of the magnet holder 330 are provided at equal intervals in the circumferential direction.

The inner surface in the radial direction of the rotor magnet 320 is a flat surface. The claw portion 332 is located at an end portion in the circumferential direction of the rotor magnet 320. Since the inner surface in the radial direction of the rotor magnet 320 is a flat surface, a gap between the rotor magnet 320 and the stator 200 is larger at the end portion than at the center portion in the circumferential direction of the rotor magnet 320. When the claw portion 332 is provided at the end portion in the circumferential direction of such a rotor magnet 320, the claw portion 332 does not interfere with the rotation of the motor 100 and can reliably hold the rotor magnet 320.

One claw portion 332 of the plurality of claw portions 332 holds ends in the circumferential direction of both of two adjacent rotor magnets 320 of the plurality of rotor magnets 320. Since one claw portion 332 holds both of the adjacent rotor magnets 320, the length in the circumferential direction of the claw portion 332 can be increased, and the strength of the claw portion 332 can be increased. The rotor magnets 320 adjacent to each other in the circumferential direction have different poles from each other. Therefore, when the rotor magnets 320 face the stator 200, a force outward in the radial direction acts on the other of the rotor magnets 320 when a force inward in the radial direction acts on one of the rotor magnets 320. Therefore, one claw portion 332 that holds the ends in the circumferential direction of both of the adjacent rotor magnets 320 needs only be able to support one of the rotor magnets 320.

One claw portion 332 of the plurality of claw portions 332 is located at one end in the circumferential direction of the rotor magnet 320, and another claw portion 332 adjacent to the one claw portion 332 is located at the other end in the circumferential direction of the same rotor magnet 320. Since one claw portion 332 and another claw portion 332 adjacent to the one claw portion 332 hold both ends in the circumferential direction of the rotor magnet 320, it is possible to further prevent the rotor magnet 320 from falling off inward in the radial direction.

The claw portion 332 has a first claw portion 332a extending inward in the radial direction from an inner peripheral portion of the magnet holder 330, and a second claw portion 332c extending toward the other side in the axial direction from the first claw portion 332a. In the claw portion 332, a bent portion 332b is formed when the first claw portion 332a is bent to the second claw portion 332c. The first claw portion 332a faces one side in the axial direction of the rotor magnet 320. In this way, the first claw portion 332a restricts the movement of the rotor magnet 320 toward one side in the axial direction. The second claw portion 332c faces the inner side in the radial direction of the rotor magnet 320. In this way, the second claw portion 332c restricts the movement of the rotor magnet 320 inward in the radial direction of the rotor magnet 320. The radial thickness of the second claw portion 332c is thicker than the axial thickness of one of the electromagnetic steel plates constituting the rotor core 310. In this way, the strength of the second claw portion 332c can be secured.

The magnet holder 330 holds the rotor magnets 320 via an adhesive. In this way, the adhesive can absorb the dimensional tolerance between the magnet holder 330 and the rotor magnet 320. In particular, the laminated steel plates constituting the rotor core 310 have a large dimensional tolerance, and a structure for absorbing the dimensional differences is required.

The second claw portion 332c holds the rotor magnets 320 via an adhesive. In this way, the distance between the second claw portion 332c and the rotor magnet 320 can be adjusted with the adhesive. Therefore, even when the curvature of the bent portion 332b between the first claw portion 332a and the second claw portion 332c of the claw portion 332 is small (R is gentle), the rotor magnet can be held without the interference between the claw portion 332 and the rotor magnet 320 (while the rotor magnet 320 is not affected by the curved surface of the bent portion 332b).

Figure 12:
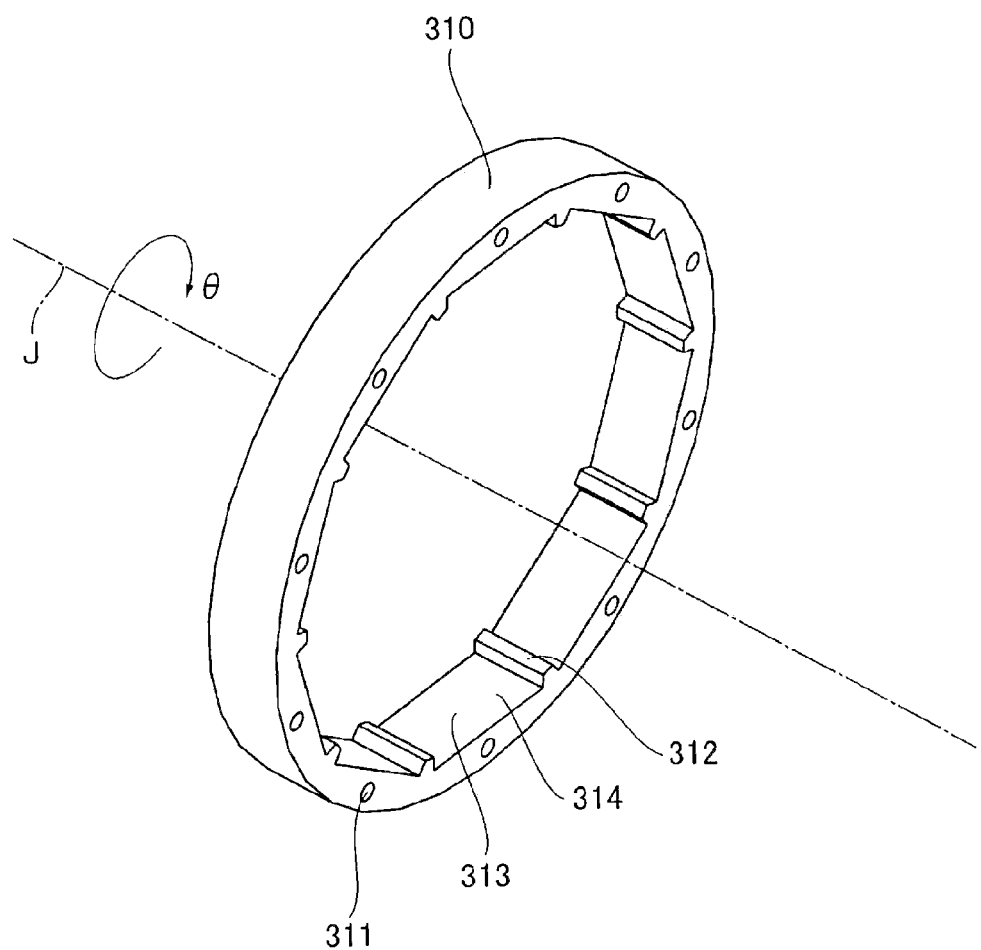
FIG. 12 is a rear perspective view of the rotor core.

FIG. 12 is a rear perspective view of the rotor core 310.

The rotor core 310 has a flat surface portion 313 between the side wall portion 312 and the side wall portion 312 adjacent to the side wall portion 312. The flat surface portion 313 is the inner surface in the radial direction of the rotor core 310. The outer surface in the radial direction of the rotor magnet 320 is fixed to the flat surface portion 313 via an adhesive. That is, the rotor core 310 has an accommodating portion 314 formed by the side wall portion 312, the side wall portion 312 adjacent to the side wall portion 312, and the flat surface portion 313 between the side wall portions 312. The accommodating portion 314 is recessed outward in the radial direction on the inner side in the radial direction of the rotor core 310. The accommodating portion 314 accommodates the rotor magnet 320.

Figure 13:
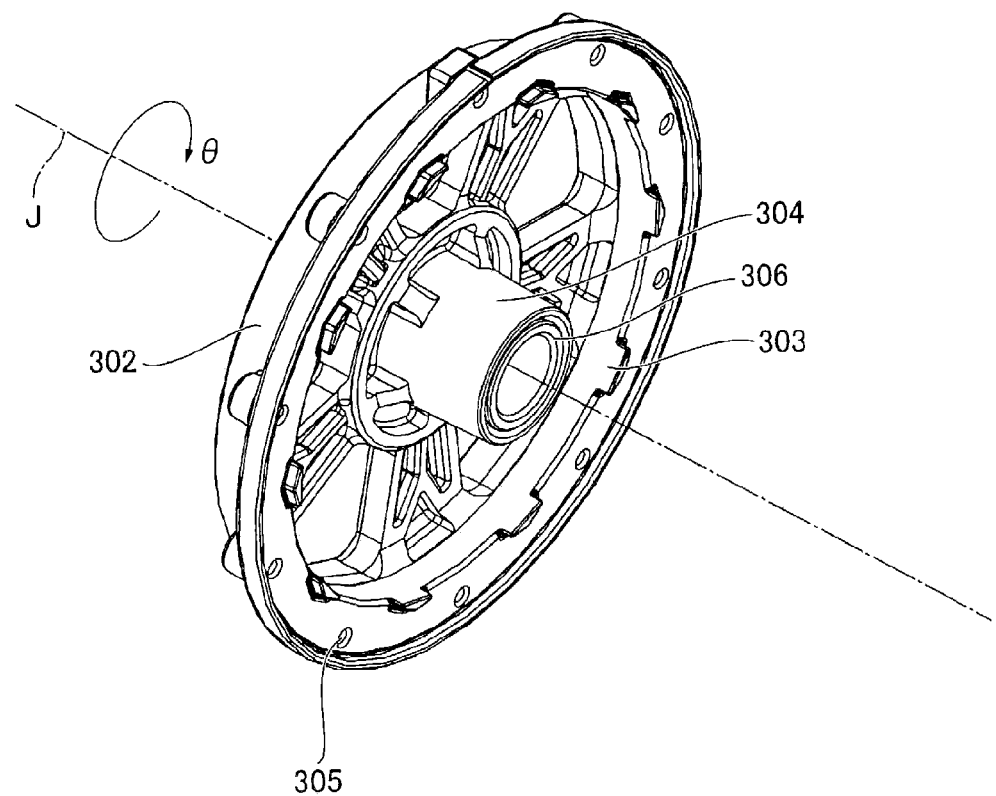
FIG. 13 is a rear perspective view of the rotor plate.

FIG. 13 is a rear perspective view of the rotor plate 302.

On the inner peripheral side of the rotor core 310, the rotor plate 302 has the claw portion 303 extending to one side in the axial direction from the other end in the axial direction of the rotor core 310. Ten claw portions 303 of the rotor plate 302 are provided at equal intervals in the circumferential direction. The claw portion 303 is provided at a position corresponding to the position in the circumferential direction of the claw portion 332 of the magnet holder 330. The claw portion 303 holds the rotor magnet 320 via an adhesive.

The length in the circumferential direction of the claw portion 332 facing the inner surface in the radial direction of the rotor magnet 320 is shorter than the length in the circumferential direction of the claw portion 303 facing the inner surface in the radial direction of the rotor magnet 320. In the facing surface between the claw portion 303 and the rotor magnet 320, the length in the circumferential direction is longer than the length in the axial direction. In the facing surface between the claw portion 332 and the rotor magnet 320, the length in the circumferential direction is shorter than the length in the axial direction.

The claw portion 303 holds the inner surface in the radial direction of the rotor magnet 320 mainly over the length in the circumferential direction. When the rotor plate 302 is an aluminum die-cast part, the rotor plate is easily bent when the claw portion 303 is long in the axial direction. Therefore, when the claw portion 303 is short in the axial direction and long in the circumferential direction, a large contact area between the claw portion 303 and the rotor magnet 320 can be secured, and the holding force can be increased. The claw portion 332 holds the inner surface in the radial direction of the rotor magnet 320 mainly over the length in the axial direction. When the magnet holder 330 is an aluminum plate, the magnet holder is easily bent in the axial direction when the claw portion 332 is long in the axial direction and short in the circumferential direction at the time of forming the claw portion 332. Further, when the claw portion 332 is long in the axial direction and short in the circumferential direction, a large contact area between the claw portion 332 and the rotor magnet 320 can be secured, and the holding force can be increased.

<Operation and Effect of Motor 100>

Next, the operation and effect of the motor 100 will be described.

The invention according to the above-described embodiment provides a motor including a central shaft extending in an axial direction; a stator extending in the axial direction around the central shaft; a rotor facing the outer side in a radial direction of the stator and configured to rotate around the central shaft; a substrate which is located on one side in the axial direction with respect to the rotor and on which a rotation position detection circuit that detects the rotation position of the rotor is mounted; and a case located on one side in the axial direction with respect to the substrate and configured to support the stator. The stator has a restricting portion configured to restrict the position in a circumferential direction of the substrate, the case has a fixing portion configured to fix the substrate, and the substrate has a restricted portion whose position in the circumferential direction is restricted by the restricting portion, and a fixed portion fixed to the fixing portion.

Since the substrate is fixed to the case, the substrate can be easily retrofitted and replaced.

Further, the rotation position detection circuit has a Hall IC, and a connector configured to connect the Hall IC and the outside is mounted on the substrate.

The rotation position of the rotor can be detected by the Hall IC.

A lead wire from the winding of the stator is not connected to the substrate. Therefore, the substrate does not have a power line for driving the motor. On the substrate, a Hall signal component connected to a motor drive control IC is arranged, and there is no motor drive control IC or the like. Therefore, the substrate can be easily retrofitted and replaced.

Further, the fixing portion and the fixed portion are located on the outer side in the radial direction with respect to the rotor.

Since the fixing portions and the fixed portions are located on the outer side in the radial direction with respect to the rotor, the substrate can be easily fixed and removed.

Further, the fixing portion has a screw hole extending in the axial direction, the fixed portion has a hole facing the screw hole in the axial direction and penetrating in the axial direction, and the substrate is fixed to the case by a screw penetrating the hole being screwed into the screw hole.

Since the substrate and the case are fixed with the hole of the substrate and the screw hole of the case, the substrate can be easily fixed and removed.

Further, three or more fixing portions and fixed portions are provided, and the restricting portion and the restricted portion are located in a polygon having the three or more fixing portions and fixed portions as vertices.

Since the restricting portion and the restricted portion are located in the polygon having the three or more fixing portions and fixed portions as vertices, the positional deviation in the circumferential direction of the substrate can be reduced.

Further, the stator has a stator core and an insulator fixed to the stator core, the restricting portion has a plurality of convex portions protruding outward in the radial direction on the outer surface side of the insulator, the restricted portion has a plurality of concave portions recessed outward in the radial direction on the inner surface side of the substrate, and the plurality of convex portions are fitted into the plurality of concave portions to restrict the position in the circumferential direction of the substrate.

Since the convex portions are fitted into the concave portions, the substrate can be accurately positioned.

Since the convex portions are provided on the thin-walled portions on the outer side in the radial direction of the insulator, the convex portions can serve as reinforcing ribs for the thin-walled portions, and can suppress the deformation in the radial direction of the insulator. The deformation in the radial direction of the insulator causes the position of the substrate to be shifted.

Further, a tangent line to one side surface in the circumferential direction of the concave portion on one end side in the circumferential direction among the plurality of concave portions is parallel to a tangent line to the other side surface in the circumferential direction of the concave portion on the other end side in the circumferential direction among the plurality of concave portions.

Therefore, when retrofitting the substrate, the convex portions can be smoothly fitted into the concave portions, and the substrate can be easily retrofitted.

The convex portions have a semicircular shape as viewed from the axial direction. The convex portions may have a triangular shape as viewed from the axial direction. The convex portions may have a trapezoidal shape as viewed from the axial direction.

The invention according to the above-described embodiment provides a motor including a central shaft extending in an axial direction; a stator extending in the axial direction around the central shaft; and a rotor facing the outer side in a radial direction of the stator and configured to rotate around the central shaft. The rotor includes a rotor plate fitted with the central shaft, a rotor core fitted with the rotor plate and having an accommodating portion recessed outward in the radial direction on the inner side in the radial direction, a rotor magnet accommodated in the accommodating portion and facing the stator on the inner side in the radial direction, and a magnet holder having a holder claw portion that restricts the movement of the rotor magnet toward one side in the axial direction and inward in the radial direction.

Therefore, the magnet holder can prevent the rotor magnet from falling off inward in the radial direction.

Further, the holder claw portion has a first claw portion extending inward in the radial direction from the inner peripheral portion and a second claw portion extending toward the other side in the axial direction from the first claw portion. The first claw portion faces one side in the axial direction of the rotor magnet, and the second claw portion faces the inner side in the radial direction of the rotor magnet.

Therefore, the rotor core, the rotor plate, and the magnet holder can hold the rotor magnet from six directions, so that it is possible to further prevent the rotor magnet from falling off.

Further, the inner surface in the radial direction of the rotor magnet is a flat surface, and the holder claw portion is located at an end portion in the circumferential direction of the rotor magnet.

Since the inner surface in the radial direction of the rotor magnet is a flat surface, the gap between the rotor magnet and the stator is larger at the end portion than at the center portion in the circumferential direction of the rotor magnet. When the holder claw portion is provided at the end portion in the circumferential direction of such a rotor magnet, the holder claw portion does not interfere with the rotation of the motor and can reliably hold the rotor magnet.

Further, the rotor has a plurality of rotor magnets adjacent to each other in the circumferential direction, and the holder claw portion holds the ends in the circumferential direction of both of the adjacent rotor magnets.

Since the holder claw portion holds both of the adjacent rotor magnets, the length in the circumferential direction of the holder claw portion can be increased, and the strength of the holder claw portion can be increased.

The adjacent rotor magnets have different poles from each other. Therefore, when the rotor magnets face the stator, a force outward in the radial direction acts on the other of the rotor magnets when a force inward in the radial direction acts on one of the rotor magnets. Therefore, one holder claw portion that holds the ends in the circumferential direction of both of the adjacent rotor magnets needs only be able to support one of the rotor magnets.

Further, the magnet holder has a plurality of holder claw portions adjacent to each other in the circumferential direction, one of the plurality of holder claw portions is located at one end in the circumferential direction of the rotor magnet, and another one adjacent to the holder claw portion is located at the other end in the circumferential direction of the rotor magnet.

Since both ends in the circumferential direction of the rotor magnet are held, it is possible to further prevent the rotor magnet from falling off inward in the radial direction.

Further, the magnet holder is made of a non-magnetic material.

Since the magnet holder is made of a non-magnetic material, it does not affect the poles of the rotor magnet. Further, even when the poles of adjacent rotor magnets are different, the magnetic force will not be short-circuited. Moreover, there is no influence on the magnetic force toward the Hall IC.

Further, the rotor core is composed of a laminated steel plate formed by laminating a plurality of electromagnetic steel plates in the axial direction, and the axial thickness of the magnet holder is thicker than the axial thickness of one electromagnetic steel plate.

Therefore, the strength of the magnet holder can be secured.

Further, the radial thickness of the second claw portion is thicker than the axial thickness of one electromagnetic steel plate.

Further, the magnet holder holds the rotor magnet via an adhesive.

Therefore, the adhesive can absorb the dimensional tolerance between the magnet holder and the rotor magnet. In particular, the laminated steel plates have a large dimensional tolerance, and a structure for absorbing the dimensional differences is required.

Moreover, even when the curvature of the bent portion between the first claw portion and the second claw portion of the holder claw portion is small (R is gentle), the rotor magnet can be held without the interference between the holder claw portion and the rotor magnet (while the rotor magnet is not affected by the curved surface of the bent portion).

Further, the rotor plate includes a rotor plate having a plate claw portion that restricts the movement of the rotor magnet toward the other side in the axial direction and inward in the radial direction.

The rotor plate can further prevent the rotor magnet from falling off inward in the radial direction.

Further, the plate claw portion extends to one side in the axial direction from the inner peripheral portion of the rotor plate, and the plate claw portion faces the inner side in the radial direction of the rotor magnet.

The rotor core, the rotor plate, and the magnet holder can hold the rotor magnet from six directions, so that it is possible to further prevent the rotor magnet from falling off.

Further, the length in the circumferential direction of the holder claw portion facing the inner surface of the rotor magnet is shorter than the length in the circumferential direction of the plate claw portion facing the inner surface of the rotor magnet.

The plate claw portion holds the inner surface of the rotor magnet mainly over the length in the circumferential direction. The rotor plate is an aluminum die-cast part and is easily bent when it is long in the axial direction. Therefore, when the plate claw portion is short in the axial direction and long in the circumferential direction, a large contact area between the plate claw portion and the rotor magnet can be secured, and the holding force can be increased.

The holder claw portion holds the inner surface of the rotor magnet mainly over the length in the axial direction. The magnet holder is an aluminum plate and is easily bent when the holder claw portion is long in the axial direction and short in the circumferential direction. Further, when the holder claw portion is long in the axial direction and short in the circumferential direction, a large contact area between the holder claw portion and the rotor magnet can be secured, and the holding force can be increased.

Further, in the facing surface between the plate claw portion and the rotor magnet, the length in the circumferential direction is longer than the length in the axial direction.

Moreover, in the facing surface between the holder claw portion and the rotor magnet, the length in the circumferential direction is longer than the length in the axial direction.

Second Embodiment

Next, a second embodiment of the invention will be described. Since a basic configuration of the motor 100 in the present embodiment is not different from that in the first embodiment, a duplicate description will be omitted, and only the different parts will be described. In other words, unless otherwise noted in the present embodiment, the configuration of the motor 100 is the same as that in the first embodiment.

<Overall Configuration>

Figure 14:
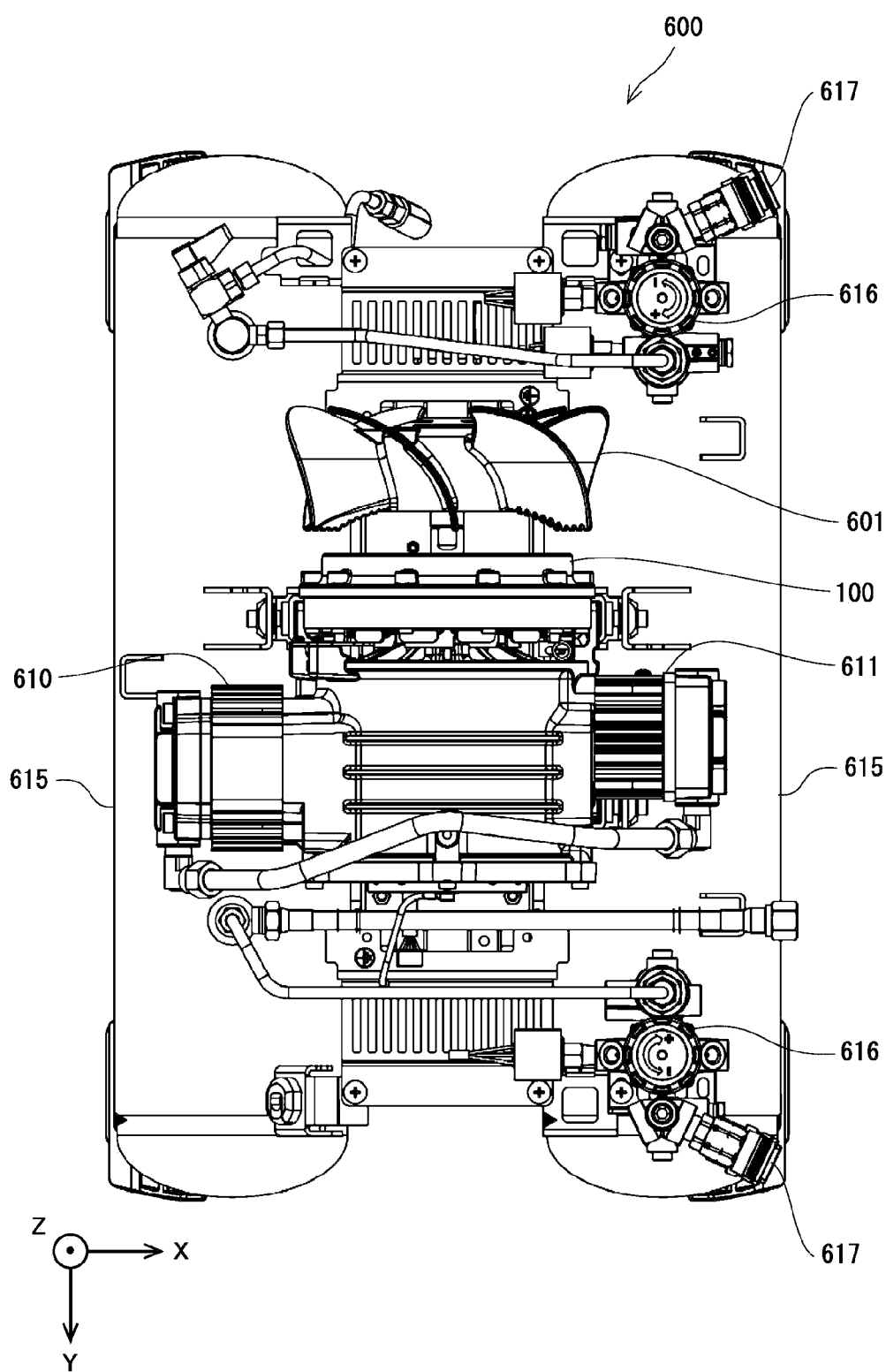
FIG. 14 is a plan view of an air compressor from which a cover (not shown) is removed.

FIG. 14 shows an air compressor 600 according to a second embodiment of the invention. FIG. 14 is a plan view showing a state in which a cover (not shown) covering an upper surface of the air compressor 600 is removed. The air compressor 600 is a portable compressor, and is used in a state of being mounted on the ground with the +Z direction as the upward direction and the −Z direction as the downward direction.

As shown in FIG. 14, the air compressor 600 according to the present embodiment includes two tanks 615 and a mechanism part arranged above the tanks 615. The mechanism part includes the motor 100, a fan 601, a compression mechanism, a control board, and the like.

The fan 601 is provided for introducing cooling air into the mechanism part to cool heat-generating parts such as the motor 100 and the control board. The fan 601 is fixed to the shaft 301 of the motor 100, and is configured to integrally rotate when the motor 100 is driven.

The compression mechanism is driven by the motor 100 to generate compressed air, and compresses the air introduced into a cylinder by reciprocating a piston. The air compressor 600 according to the present embodiment is a multi-stage compressor having two compression mechanisms of a primary compression mechanism 610 and a secondary compression mechanism 611.

Figure 19:
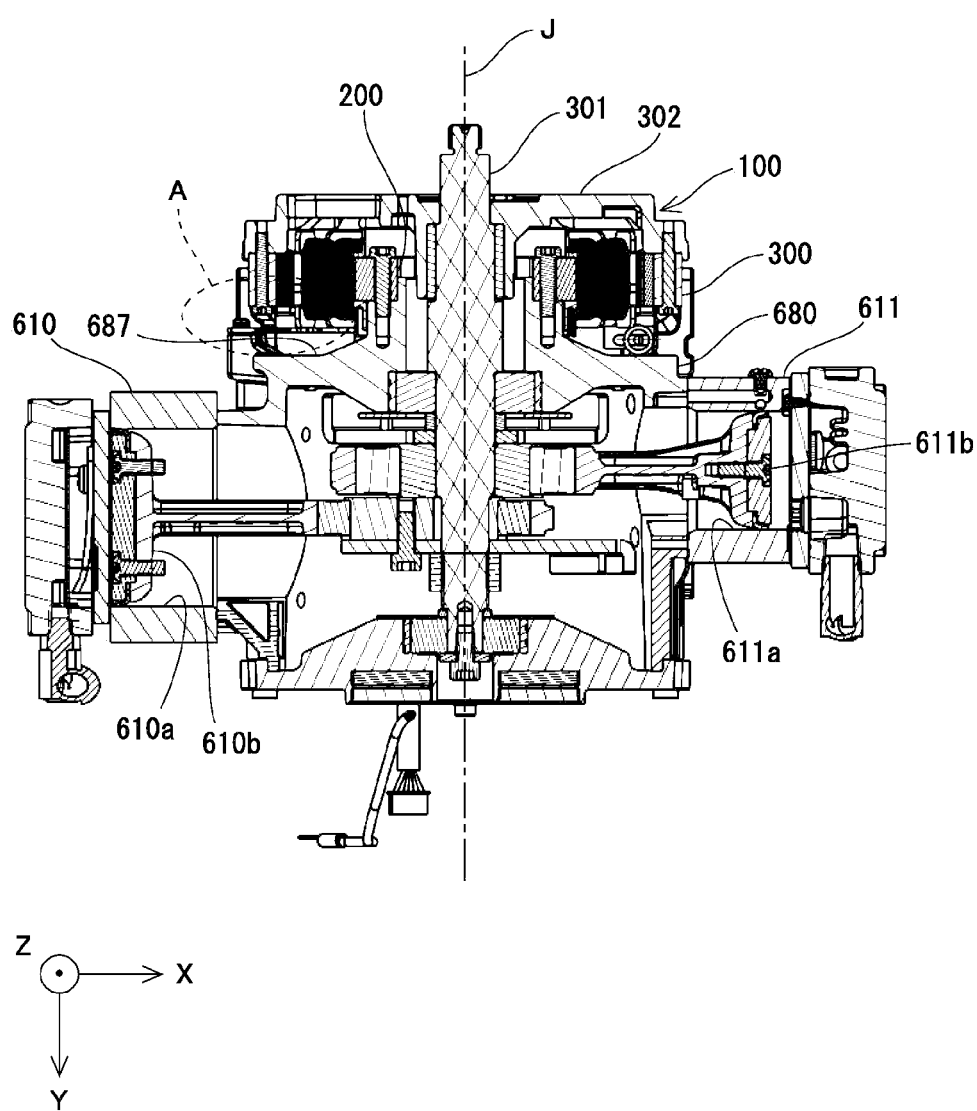
FIG. 19 is a plan sectional view showing the compression mechanism and the motor shown in FIG. 15, taken along a plane orthogonal to the Z-axis and passing through the central axis J.

As shown in FIG. 19, the primary compression mechanism 610 includes a primary cylinder 610a and a primary piston 610b reciprocally arranged in the primary cylinder 610a, and the air in the primary cylinder 610a can be compressed by reciprocating the primary piston 610b with the driving force of the motor 100. Further, the secondary compression mechanism 611 includes a secondary cylinder 611a and a secondary piston 611b reciprocally arranged in the secondary cylinder 611a, and the air in the secondary cylinder 611a can be compressed by reciprocating the secondary piston 611b with the driving force of the motor 100. The air supplied form the outside is first compressed by the primary compression mechanism 610. The air compressed by the primary compression mechanism 610 is introduced into the secondary compression mechanism 611 and further compressed by the secondary compression mechanism 611. The air compressed in two stages in this way is sent and stored in the tank 615.

The tank 615 is provided for storing the compressed air generated by the compression mechanism. The air compressor 600 according to the present embodiment includes two tanks 615. The two tanks 615 are arranged parallel to each other along the longitudinal direction of the air compressor 600.

The compressed air stored in the tank 615 is depressurized to an arbitrary pressure by passing through a pressure reducing valve 616, and can be taken out from an air outlet to the outside. In the present embodiment, an air coupler 617 is provided at the air outlet, and an air hose can be attached and detached with one touch. By connecting the air hose to the air outlet in this way, the compressed air in the tank 615 can be taken out and used.

Meanwhile, although not particularly shown, a control board that controls the entire operation of the air compressor 600 is provided between the compression mechanism and the tank 615. This control board is arranged on the lower surface side of the compression mechanism so as to be substantially horizontal to the ground. This control board is mainly composed of a CPU, and includes a ROM, a RAM, and an I/O, and the like. Further, the CPU is configured to control various input devices and output devices by reading a program stored in the ROM.

Examples of the input device of this control board include various operation switches, pressure sensors, Hall ICs (rotation position detection circuit), thermistors, and the like. Meanwhile, the input device is not limited to these input devices, and other input devices may be provided.

The operation switch refers to various switches that can be operated by a user. Although not described in detail herein, for example, a plurality types of operation switches such as a switch for turning the power on and off and a switch for switching the operation mode may be provided. This operation switch is arranged on an operation panel provided on the surface of a cover (not shown).

The pressure sensor is provided for measuring the internal pressure of the tank 615. The control board controls the start or stop of the driving of the motor 100 based on the pressure value detected by the pressure sensor. Specifically, the ON pressure, which is a pressure value for starting the driving of the compression mechanism, and the OFF pressure, which is a pressure value for stopping the driving of the compression mechanism, are preset. For example, when the internal pressure of the tank 615 drops due to the use of compressed air and the internal pressure of the tank 615 drops to the preset ON pressure, the motor 100 is driven to fill the compressed air. Further, when the internal pressure of the tank 615 reaches the preset OFF pressure while the motor 100 is being driven, the driving of the motor 100 is stopped.

As already described in the first embodiment, the Hall IC (rotation position detection circuit) is provided for detecting the rotation position of the motor 100. The control board can calculate the rotation speed (rpm) of the motor 100 by analyzing the signal from the Hall IC.

The thermistor is provided for detecting the temperature of the motor 100. The temperature detected by this thermistor is used to correct the control of the motor 100.

Further, as the output device of this control board, the motor 100 is provided. That is, the control board is configured to control the rotation of the motor 100 based on the input signal from the input device described above.

Subsequently, a specific aspect of the compression mechanism and the motor 100 according to the present embodiment will be described.

Figure 15:
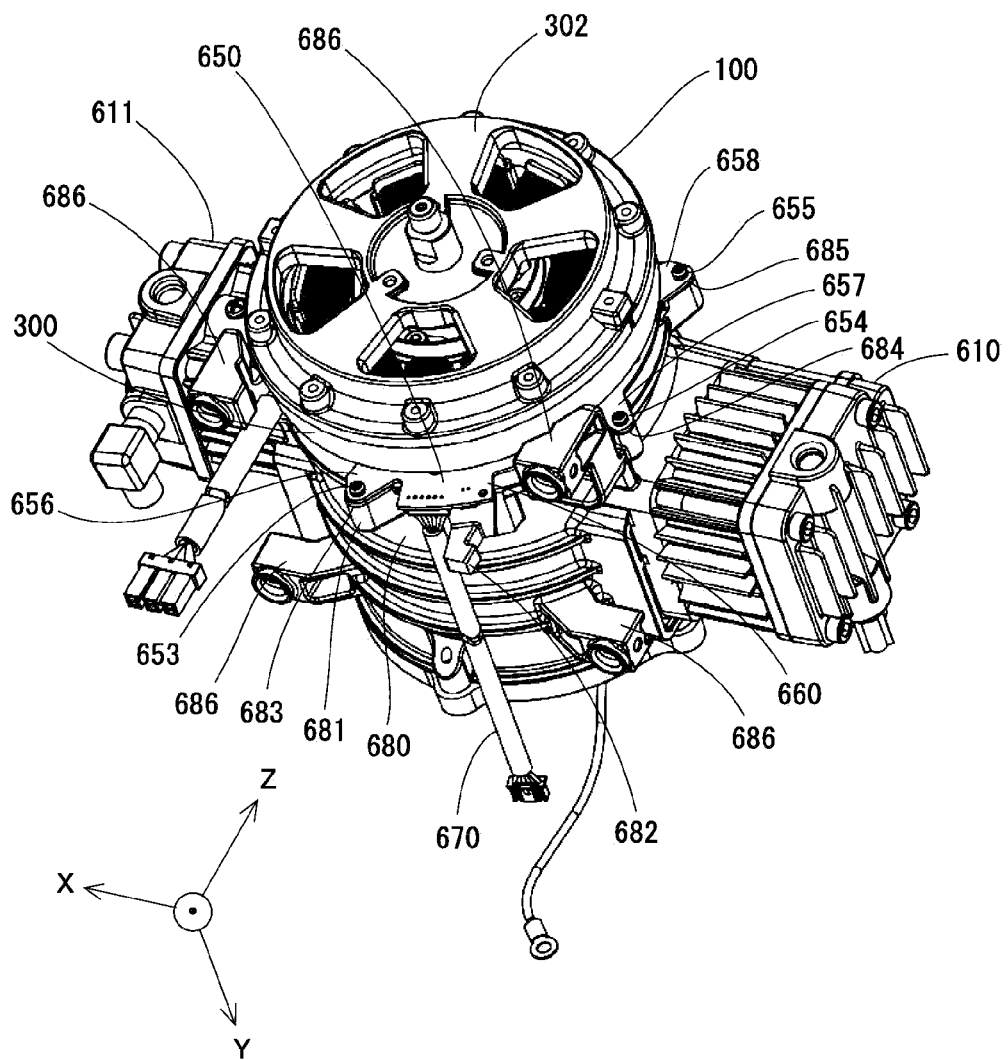
FIG. 15 is a perspective view of a compression mechanism and the motor.

FIG. 15 is a perspective view of the compression mechanism and the motor 100.

Figure 16:
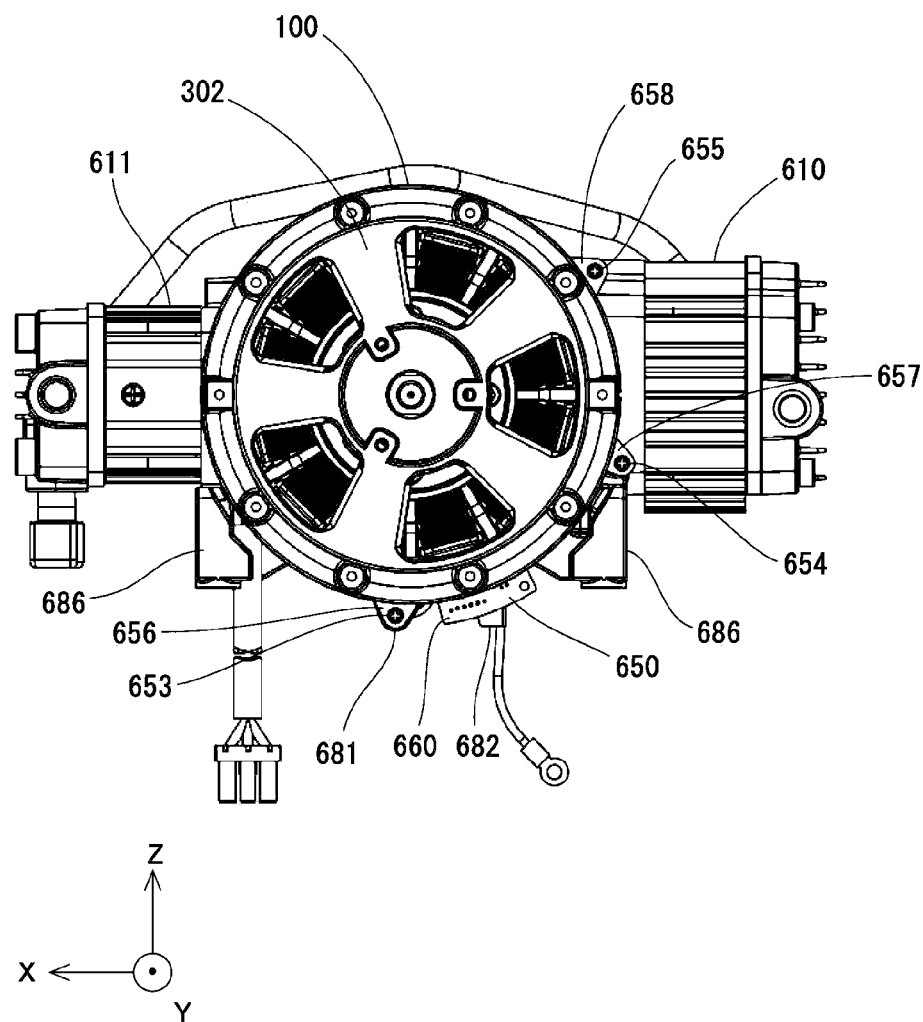
FIG. 16 is a front view of the compression mechanism and the motor shown in FIG. 15, as viewed from the −Y side.

FIG. 16 is a front view of the compression mechanism and the motor 100 shown in FIG. 15, as viewed from the −Y side.

Figure 17:
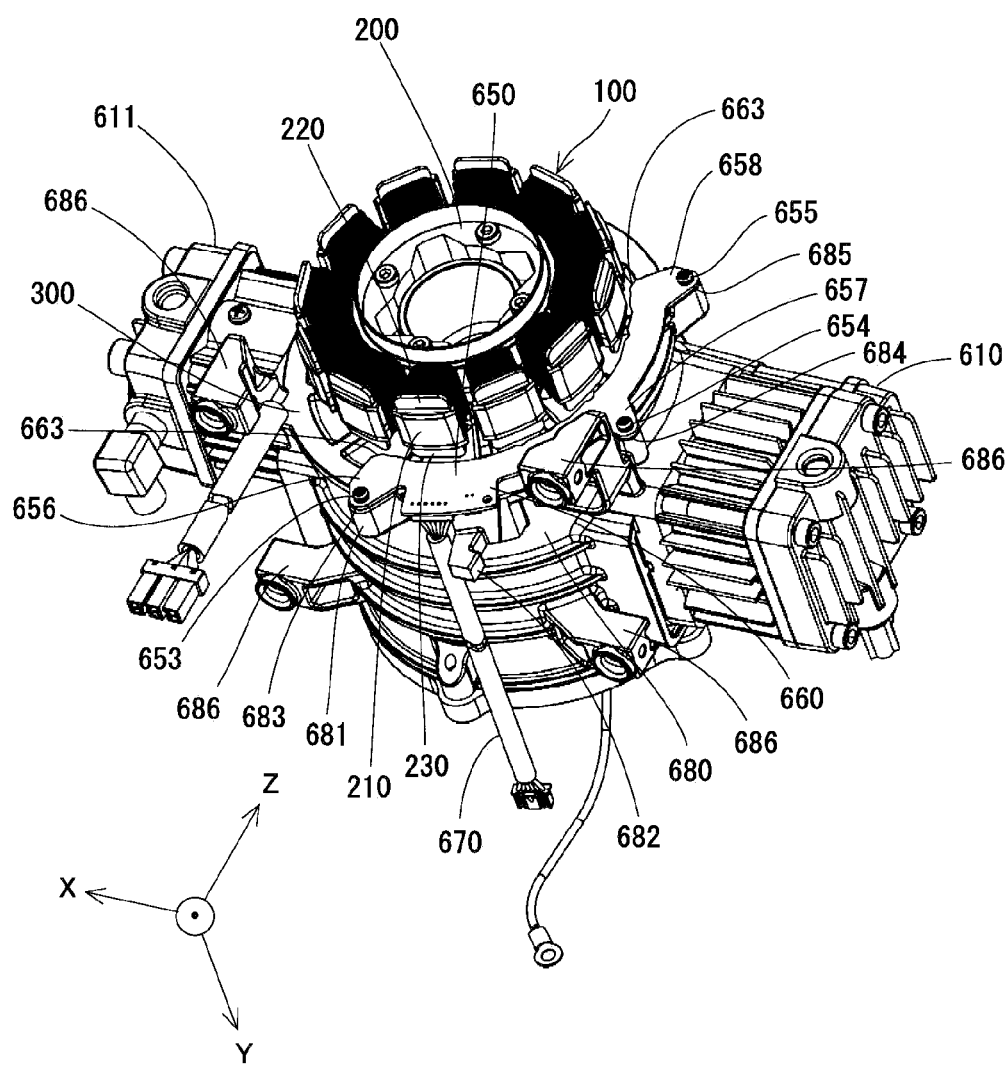
FIG. 17 is a perspective view showing a state in which the rotor plate is removed from FIG. 15.

FIG. 17 is a perspective view showing a state in which the rotor plate 302 is removed from FIG. 15.

Figure 18:
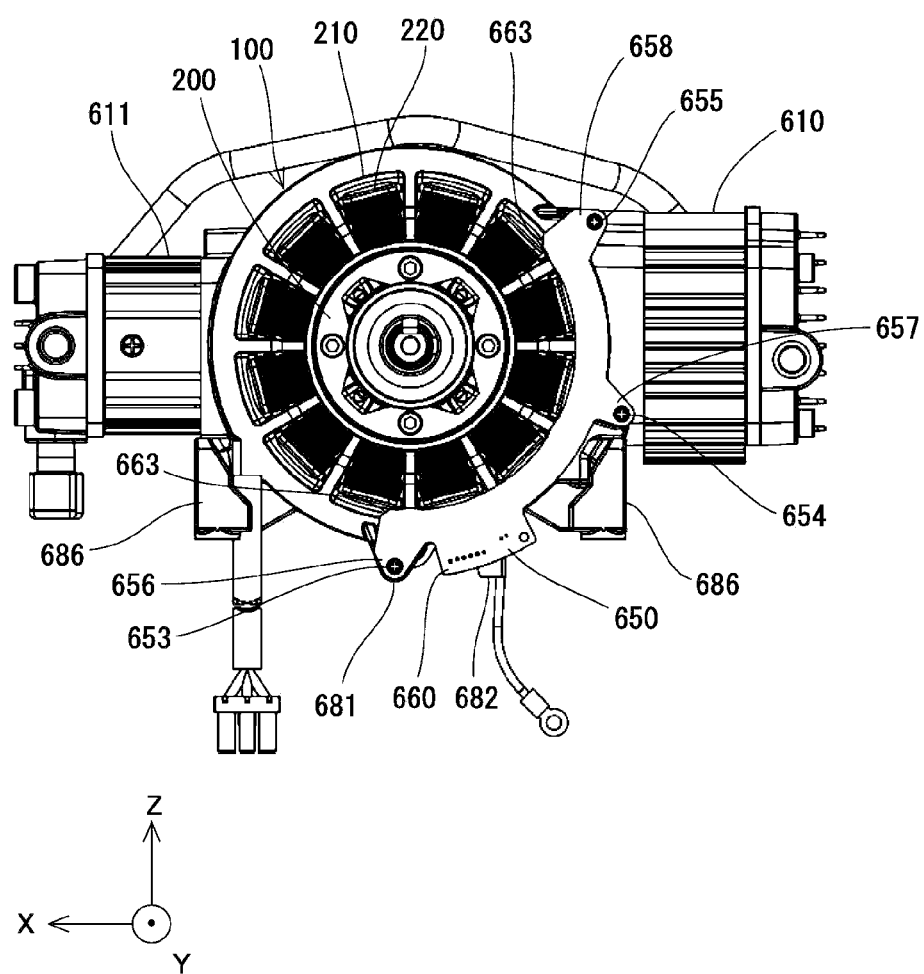
FIG. 18 is a front view showing a state in which the rotor plate is removed from the compression mechanism and the motor shown in FIG. 15, as viewed from the −Y side.

FIG. 18 is a front view showing a state in which the rotor plate 302 is removed from the compression mechanism and the motor 100 shown in FIG. 15, as viewed from the −Y side.

The compression mechanism and the motor 100 according to the present embodiment include the shaft 301 extending in the axial direction, the stator 200, the rotor 300, a substrate 650, and a case 680.

The motor 100 is an outer rotor type motor in which the rotor 300 is arranged on the outer side in the radial direction of the stator 200. Basic aspects of the stator 200 and the rotor 300 are the same as those in the first embodiment.

In the present embodiment, as shown in FIGS. 15 and 16, the motor 100 is arranged on the front side (-Y side) of the compression mechanism. As shown in FIG. 19, the shaft 301 of the motor 100 penetrates the inside of the compression mechanism, and cylinders of the compression mechanism protrude on both the left and right sides of the shaft 301. Specifically, the primary compression mechanism 610 is arranged on the -X side of the shaft 301, and the secondary compression mechanism 611 is arranged on the +X side of the shaft 301. The shaft 301 of the motor 100 serves as a crankshaft of the compression mechanism. The crankshaft and crank mechanism are well known structures. That is, a crank arm is attached to the shaft 301 (crankshaft), and a connecting rod is attached to the crank arm via a crank pin. A piston is attached to the tip of the connecting rod. When the shaft 301 rotates, the crank arm attached to the shaft 301 (crankshaft) rotates, and thus, the connecting rod reciprocates while swinging. With such an action, the rotation motion of the shaft 301 is converted into the reciprocating motion of the piston, and the compression mechanisms arranged on both sides of the shaft 301 are activated.

As shown in FIGS. 17 and 18, the substrate 650 has an arcuate shape with a central angle of about 120 degrees and has a length of 120 degrees in the circumferential direction. Similar to the first embodiment, on this substrate 650, the Hall ICs (not shown) are mounted at intervals of 60 degrees in the circumferential direction. The Hall IC is an example of a rotation position detection circuit that detects the rotation position of the rotor 300. Meanwhile, although not particularly shown, the Hall IC according to the present embodiment is a Hall IC for surface mounting and is surface-mounted on the substrate 650. When the Hall IC for surface mounting is used, the thickness in the axial direction can be suppressed.

Figure 21:
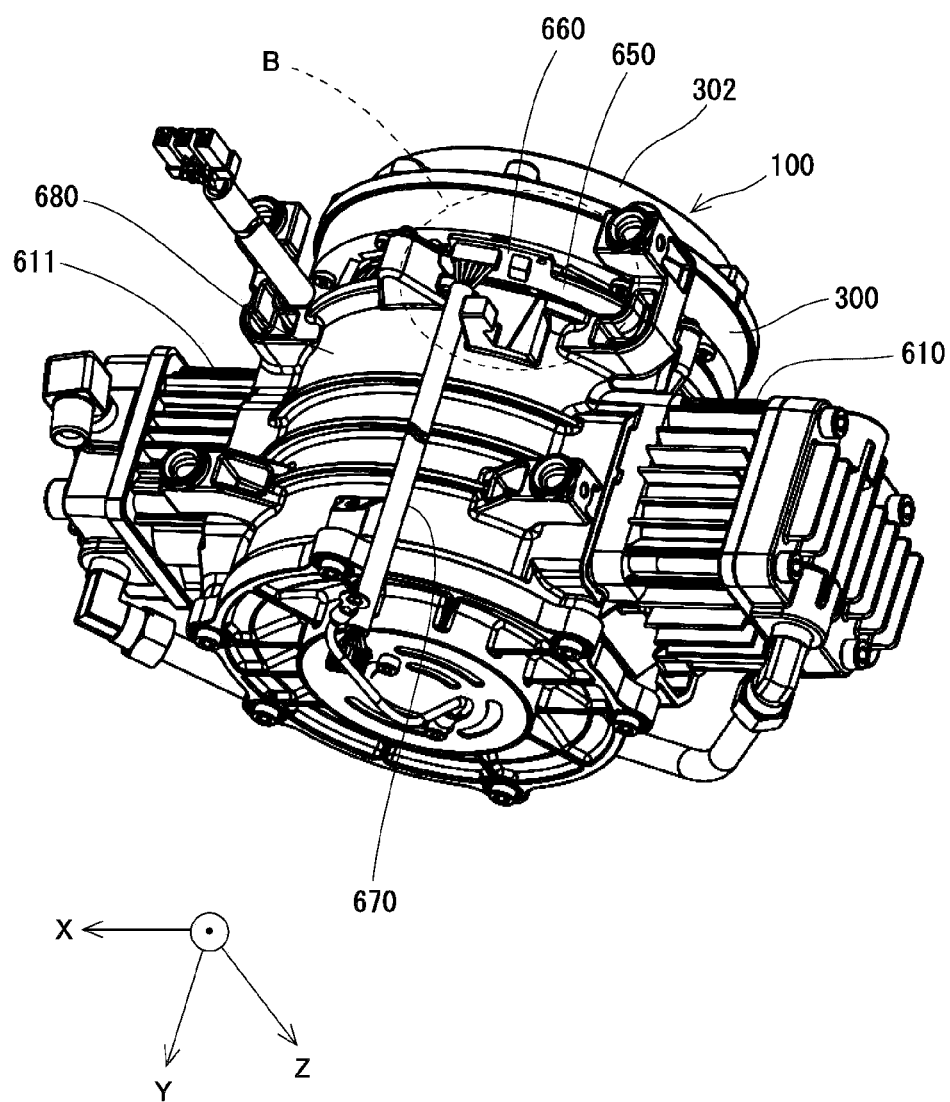
FIG. 21 is a rear perspective view of the compression mechanism and the motor shown in FIG. 15, as viewed from the +Y side.
Figure 22:
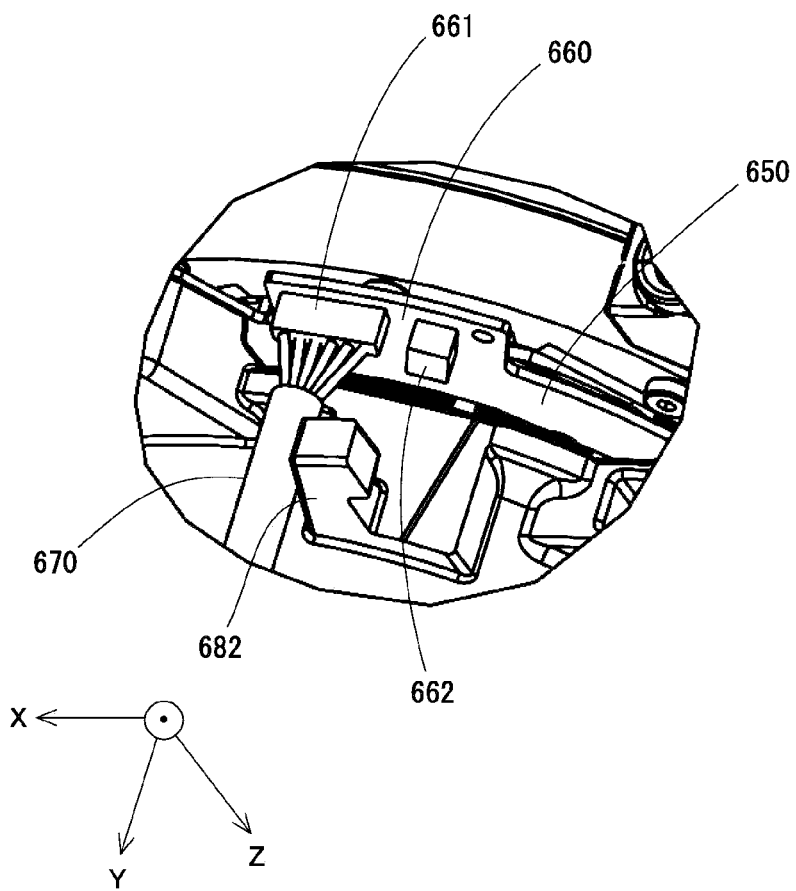
FIG. 22 is an enlarged view of the part "B" shown in FIG. 21.

This substrate 650 includes a connector arrangement portion 660 in which a connector to which an electric wire 670 can be connected is arranged. As shown in FIG. 18 and the like, this connector arrangement portion 660 is provided to protrude outward in the radial direction and located on the outer side in the radial direction with respect to the rotor 300. In the present embodiment, a plurality of connectors are arranged on either the front or back surface of this connector arrangement portion 660. Specifically, as shown in FIGS. 21 and 22, a control board connector 661 for connecting the control board and a thermistor connector 662 are arranged on the surface of the connector arrangement portion 660 on the side of the compression mechanism. A lead type thermistor is connected to the thermistor connector 662. The control board connector 661 has a terminal capable of externally outputting the signal detected by the Hall IC and the signal of the thermistor inputted to the substrate 650 via the thermistor connector 662. As the substrate 650 and the control board are connected by the electric wire 670 via these connectors, a signal can be outputted from the substrate 650 to the control board and used for feedback control.

Meanwhile, in the present embodiment, an axis of the motor 100 is arranged in a horizontal direction, and a control board having a control circuit for the motor 100 is arranged below the motor 100. Further, as shown in FIG. 18 and the like, the connector arrangement portion 660 described above is arranged below the rotor 300. Therefore, the electric wire 670 connected to the connector of the substrate 650 can be routed downward as it is and connected to the control board.

In this way, the structure is such that the electric wire 670 can be easily handled. Further, since the connector arrangement portion 660 is not exposed on the upper surface, the structure is such that the substrate 650 is not easily damaged.

Further, this substrate 650 has protrusions 656, 657, and 658 protruding outward in the radial direction. These protrusions 656, 657, and 658 are provided at intervals of 60 degrees in the circumferential direction. Through-holes 653, 654, and 655 penetrating in the axial direction are formed in the protrusions 656, 657, and 658, respectively.

The case 680 is a crankcase in which a part of the compression mechanism is incorporated. The case 680 according to the present embodiment incorporates a crank part that is a part of the compression mechanism. The crank part is a part of the compression mechanism and is a mechanism part around the crankshaft including the crank arm described above. This case 680 is located on one side in the axial direction with respect to the substrate 650. This case 680 has four leg portions 686 protruding downward and is secured above the tank 615 by the four leg portions 686. Meanwhile, of the four leg portions 686, the pair of leg portions 686 arranged on the front side (-Y side) are arranged on the outer side in the radial direction of the substrate 650.

The case 680 supports the stator 200. The case 680 may not directly support the stator 200. The substrate 650 is fixed to the case 680 by being screwed into screw holes 683, 684, and 685 of the case 680 through the through-holes 653, 654, and 655. The screw holes 683, 684, and 685 of the case 680 extend from one end in the axial direction to the other side in the axial direction. The screw holes 683, 684, and 685 of the case 680 are examples of the fixing portions. The through-holes 653, 654, and 655 of the substrate 650 are examples of the fixed portions. Three or more fixing portions and fixed portions are provided. Since the substrate 650 is fixed to the case 680 instead of being fixed to the stator 200, the substrate 650 can be easily retrofitted and replaced.

Further, this case 680 rotatably supports the crankshaft (the shaft 301) of the compression mechanism. The case 680 may not directly support the crankshaft.

The through-holes 653, 654, and 655 of the substrate 650 are located on the outer side in the radial direction with respect to the rotor 300. That is, the fixing portions and the fixed portions are located on the outer side in the radial direction with respect to the rotor 300. In this way, the substrate 650 can be easily fixed and removed.

The case 680 described above has a support portion protruding outward in the radial direction from the substrate 650. Specifically, as shown in FIGS. 15 and 16, the case 680 has a first support portion 681 protruding downward (-Z side) from the protrusion 656 of the substrate 650, and a second support portion 682 protruding downward (-Z side) from the connector arrangement portion 660 of the substrate 650. Since the support portion protruding outward in the radial direction from the substrate 650 in this way, the substrate 650 does not hit against the floor surface when the case 680 is placed on the floor surface.

By the way, the insulator 230 according to the present embodiment does not have the convex portions 231, 232, and 233 described in the first embodiment, and the substrate 650 according to the present embodiment does not have the concave portions 421, 422, and 423 described in the first embodiment. Therefore, the present embodiment is not configured such that the position in the circumferential direction of the substrate 400 is restricted by fitting the convex portions 231, 232, and 233 into the concave portions 421, 422, and 423. The substrate 650 according to the present embodiment is attached to the case 680 so as not to come into contact with the insulator 230.

Figure 20:
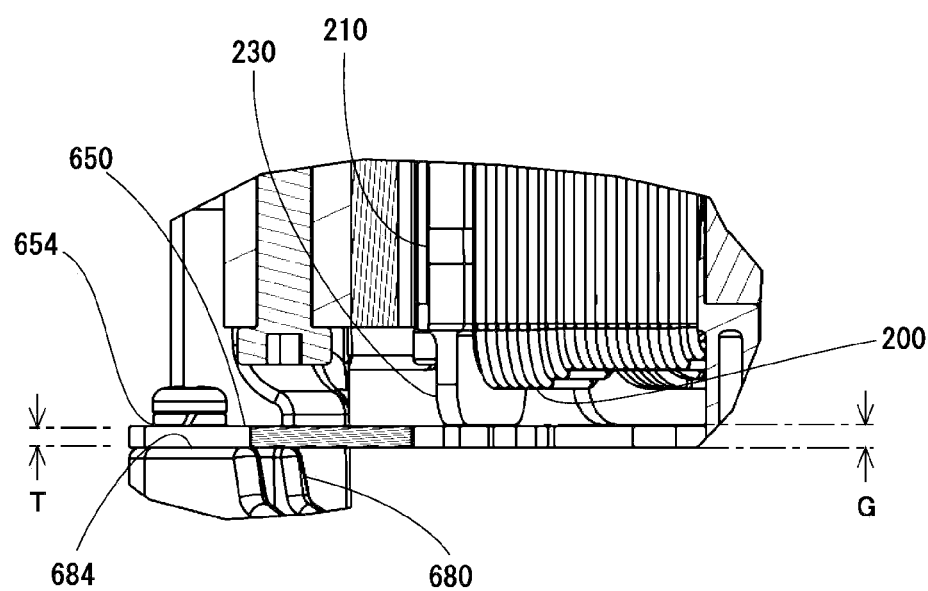
FIG. 20 is an enlarged view of the part "A" shown in FIG. 19.

Further, as shown in FIG. 20, as viewed in the axial direction, a gap G larger than a thickness T of the substrate 650 is provided between the insulator 230 and the fixing portion of the case 680. Therefore, even when the substrate 650 is slid horizontally in the X-axis direction or the Y-axis direction, the substrate 650 does not come into contact with the insulator 230. By setting in this manner, the substrate 650 can be moved inward to overlap the insulator 230, so that the substrate 650 can be moved relatively freely.

Here, in the present embodiment, as shown in FIG. 15, the leg portions 686 are arranged on the outer side in the radial direction of the substrate 650. Therefore, the substrate 650 cannot be slid outward in the radial direction as it is. Further, the leg portion 686 is arranged between the protrusions 653, 654 of the substrate 650. Therefore, when the substrate 650 is slid in the circumferential direction as it is, the protrusions 653, 654 interfere with the leg portion 686. In such an arrangement, when the convex portions 231, 232, and 233 are fitted into the concave portions 421, 422, and 423 as in the first embodiment, the leg portions 686 may become an obstacle and the substrate 650 may not be replaced. In this regard, in the present embodiment, the gap G larger than the thickness T of the substrate 650 is provided between the insulator 230 and the fixing portion of the case 680. Therefore, the substrate 650 can be rotated in the circumferential direction, and the substrate 650 can be replaced while avoiding the leg portions 686. Meanwhile, in the present embodiment, the fixing portion of the case 680 is formed to protrude toward the motor 100 as viewed in the axial direction. Therefore, a recessed portion 687 that is recessed to the side opposite to the motor 100 from the fixing portion as viewed in the axial direction is provided on the inner side in the radial direction of the fixing portion (see FIG. 19). This recessed portion 687 extends in the circumferential direction so as to face the stator 200. Therefore, when the substrate 650 is rotated in the circumferential direction at the time of replacement, the substrate 650 can be rotated using the recessed portion 687 of the case 680, making it difficult for the substrate 650 to come into contact with the insulator 230.

Meanwhile, the inner corner of the substrate 650 according to the present embodiment has a chamfered shape 663 (C surface in the present embodiment). Therefore, even when the inner corner of the substrate 650 comes into contact with the insulator 230 and the like at the time of sliding and replacing the substrate 650, breakage or damage is less likely to occur.

<Operation and Effect of Air Compressor 600>

Next, the operation and effect of the air compressor 600 will be described.

The invention according to the above-described embodiment provides an air compressor including a motor; a compression mechanism configured to be driven by the motor; and a crankcase in which a part of the compression mechanism is incorporated. The motor includes a central shaft extending in an axial direction; a stator extending in the axial direction around the central shaft; a rotor facing the outer side in a radial direction of the stator and configured to rotate around the central shaft; and a substrate which is located on one side in the axial direction with respect to the rotor and on which a rotation position detection circuit that detects the rotation position of the rotor is mounted. The crankcase has a fixing portion configured to fix the substrate, and the substrate has a fixed portion fixed to the fixing portion.

Since the substrate is fixed to the crankcase, the substrate can be easily retrofitted and replaced.

Further, the fixing portion and the fixed portion are located on the outer side in the radial direction with respect to the rotor.

Since the fixing portions and the fixed portions are located on the outer side in the radial direction with respect to the rotor, the substrate can be easily fixed and removed.

Further, the stator has a stator core and an insulator fixed to the stator core, and as viewed in the axial direction, a gap larger than the thickness of the substrate is provided between the insulator and the fixing portion.

Since the gap larger than the thickness of the substrate is provided between the insulator and the fixing portion, the substrate and the insulator are less likely to interfere with each other, and thus, the substrate can be easily retrofitted and replaced.

Further, the rotation position detection circuit is surface-mounted on the substrate.

When the rotation position detection circuit is surface-mounted on the substrate, the axial thickness can be reduced. Therefore, the substrate and the insulator are less likely to interfere with each other, and thus, the substrate can be easily retrofitted and replaced.

Further, the substrate has a connector arrangement portion in which a connector to which an electric wire can be connected is arranged, and the connector arrangement portion is located on the outer side in the radial direction with respect to the rotor.

Since the connector arrangement portion is located on the outer side in the radial direction with respect to the rotor, the electric wire can be easily attached to and detached from the connector, and thus, the substrate can be easily retrofitted and replaced.

Further, a plurality of connectors are arranged in the connector arrangement portion. Since a plurality of connectors are arranged in one connector arrangement portion in this way, the electric wire can be easily attached to and detached from the connector, and thus, the substrate can be easily retrofitted and replaced.

Further, an axis of the motor is arranged in a horizontal direction, a control board having a control circuit for the motor is arranged below the motor, and the connector arrangement portion is arranged below the rotor.

Since the control board is arranged below the motor and the connector arrangement portion is arranged below the rotor, the control board and the connector arrangement portion are close to each other. Therefore, the electric wire connecting both members can be easily handled, and thus, the substrate can be easily retrofitted and replaced.

Further, the crankcase has a support portion that protrudes outward in the radial direction from the substrate.

Since the support portion that protrudes outward in the radial direction from the substrate is provided, the substrate does not hit against the floor when the motor 100 and the compression mechanism are placed on the floor, and the damage of the substrate can be prevented.

Meanwhile, in the second embodiment described above, the aspect in which the insulator 230 does not have the convex portions 231, 232, and 233, and the substrate 650 does not have the concave portions 421, 422, and 423 has been described. However, the invention is not limited thereto. The same convex portions 231, 232, and 233 as those in the first embodiment may be provided on the insulator 230, and the same concave portions 421, 422, and 423 as those in the first embodiment may be provided on the substrate 650. Further, the position in the circumferential direction of the substrate 400 may be restricted by fitting the convex portions 231, 232, and 233 into the concave portions 421, 422, and 423. That is, the stator may have a restricting portion that restricts the position in the circumferential direction of the substrate, and the substrate may have a restricted portion whose position in the circumferential direction is restricted by the restricting portion.

Although the preferred embodiments of the present invention have been described above, the present invention is not limited to these embodiments, and various modifications and changes can be made within the scope of the gist thereof. These embodiments and modifications thereof are included in the scope and gist of the invention, and are included in the scope of the invention described in the claims and the equivalent scope thereof.

What is claimed is:

1. An air compressor comprising:
a motor;
a compressor configured to be driven by the motor; and
a crankcase in which a part of the compressor is incorporated, wherein the motor includes:
  a central shaft extending in an axial direction;
  a stator extending in the axial direction around the central shaft;
  a rotor facing in a radial direction an outer side of the stator and configured to rotate with the central shaft; and
  a substrate which is located on one side of the rotor in the axial direction and on which a rotation position detection circuit configured to detect a rotation position of the rotor is mounted, the substrate is configured to be removed from the crankcase in a direction perpendicular to the axial direction,
the crankcase includes a fixing portion comprising an aperture formed in the crankcase and configured to fix the substrate,
the substrate includes a fixed portion fixed to the fixing portion, wherein the fixed portion of the substrate is fixed to a rotor side of the fixing portion of the crankcase, and
the fixing portion and the fixed portion are located on an outer side of the rotor in the radial direction.

2. The air compressor according to claim 1, wherein
the stator includes a restricting portion extending in the axial direction and configured to restrict a position of the substrate in a circumferential direction of the substrate, and
the substrate includes a restricted portion whose position in the circumferential direction is restricted by the restricting portion.

3. The air compressor according to claim 1, wherein
the stator includes a stator core and an insulator fixed to the stator core, and
a gap in the axial direction provided between the insulator and the fixing portion is larger than a thickness of the substrate.

4. The air compressor according to claim 1, wherein
the rotation position detection circuit is surface-mounted on the substrate.

5. The air compressor according to claim 1, wherein
the crankcase includes a support portion that protrudes outward in the radial direction from the substrate.

6. The air compressor according to claim 1, wherein
the substrate includes a connector arrangement portion in which a connector that is connected to an electric wire is arranged, and the connector arrangement portion is located on the outer side of the rotor in the radial direction.

7. The air compressor according to claim 6, wherein
a plurality of connectors are arranged in the connector arrangement portion.

8. The air compressor according to claim 6, wherein
an axis of the motor is arranged in a horizontal direction, and a control board including a control circuit for the motor is arranged below the motor, and
the connector arrangement portion is arranged below the rotor.

9. A motor comprising:
a central shaft extending in an axial direction;
a stator extending in the axial direction around the central shaft;
a rotor facing in a radial direction an outer side of the stator and configured to rotate with the central shaft;
a substrate which is located on one side of the rotor in the axial direction and on which a rotation position detection circuit configured to detect a rotation position of the rotor is mounted; and
a case located on one side of the substrate in the axial direction and configured to support the stator, wherein
the stator includes a restricting portion extending in the axial direction and configured to restrict a position of the substrate in a circumferential direction of the substrate,
the case includes a fixing portion comprising an aperture formed in the case and configured to fix the substrate,
the substrate includes:
  a restricted portion with a corresponding shape to receive the restricting portion and whose position in the circumferential direction is restricted by the restricting portion, and
  a fixed portion fixed to the fixing portion, wherein the fixed portion of the substrate is fixed to a rotor side of the fixing portion of the case,
the substrate is configured to be removed from the case in a direction perpendicular to the axial direction, and
the fixing portion and the fixed portion are located on an outer side of the rotor in the radial direction.

10. The motor according to claim 9, wherein
the rotation position detection circuit includes a Hall IC, and
a connector configured to connect the Hall IC and an outside is mounted on the substrate.

11. The motor according to claim 9, wherein
the aperture of the fixing portion is a screw hole extending in the axial direction,
the fixed portion includes a hole facing the screw hole in the axial direction and penetrating in the axial direction, and
a screw penetrating the hole is screwed into the screw hole, so that the substrate is fixed to the case.

12. The motor according to claim 9, wherein
three or more fixing portions and fixed portions are provided, and
the restricting portion and the restricted portion are located in a polygon having the three or more of the fixing portions and the fixed portions as vertices.

13. The motor according to claim 9, wherein
the stator includes a stator core and an insulator fixed to the stator core,
the restricting portion includes a plurality of convex portions protruding outward in the radial direction on an outer surface side of the insulator, the restricted portion includes a plurality of concave portions recessed outward in the radial direction on an inner surface side of the substrate, and the plurality of convex portions are fitted into the plurality of concave portions to restrict the position of the substrate in the circumferential direction of the substrate.

14. The motor according to claim 13, wherein a tangent line to one side surface in the circumferential direction of the concave portion on one end side in the circumferential direction among the plurality of concave portions is parallel to a tangent line to the other side surface in the circumferential direction of the concave portion on the other end side in the circumferential direction among the plurality of concave portions.

\* \* \* \* \*